US012482935B2

(12) United States Patent
Guo et al.

(10) Patent No.: US 12,482,935 B2
(45) Date of Patent: Nov. 25, 2025

(54) ANTENNA SYSTEM AND ELECTRONIC DEVICE

(71) Applicant: Nanning FuLian FuGui Precision Industrial Co., Ltd., Nanning (CN)

(72) Inventors: Yu-Yuan Guo, New Taipei (TW); Chun-Chieh Chang, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 60 days.

(21) Appl. No.: 18/640,399

(22) Filed: Apr. 19, 2024

(65) Prior Publication Data

US 2025/0105509 A1 Mar. 27, 2025

(30) Foreign Application Priority Data

Sep. 27, 2023 (CN) ......................... 202311265229.3

(51) Int. Cl.

| | |
|---|---|
| ***H01Q 1/52*** | (2006.01) |
| ***H01Q 1/48*** | (2006.01) |
| ***H01Q 5/30*** | (2015.01) |
| ***H01Q 9/04*** | (2006.01) |

(52) U.S. Cl.

CPC ................. *H01Q 5/30* (2015.01); *H01Q 1/48* (2013.01); *H01Q 1/521* (2013.01); *H01Q 9/0421* (2013.01)

(58) Field of Classification Search

CPC ........ H01Q 1/48; H01Q 1/52; H01Q 5/30–40; H01Q 9/0421; H01Q 21/28–30

See application file for complete search history.

(56) References Cited

U.S. PATENT DOCUMENTS

| | | | | |
|---|---|---|---|---|
| 9,905,937 | B1 * | 2/2018 | Chiang | H01Q 21/065 |
| 10,992,030 | B2 * | 4/2021 | Han | H01Q 21/061 |
| 11,539,124 | B2 * | 12/2022 | Bai | H01Q 1/523 |

FOREIGN PATENT DOCUMENTS

| | | |
|---|---|---|
| CN | 111600136 | 8/2020 |
| CN | 114256601 | 3/2022 |
| TW | 202002407 A | 1/2020 |

* cited by examiner

*Primary Examiner* — Hasan Islam

(74) *Attorney, Agent, or Firm* — ScienBiziP, P.C.

(57) ABSTRACT

An antenna system includes: a first group of MIMO antennas including a first dual-band antenna arranged at first corner of the base, a second dual-band antenna arranged on a first side of the base, a first single band antenna arranged at a second corner of the base, a second single band antenna parallel to the base; a second group of MIMO antennas including a third single band antenna vertically arranged in a third corner of the base, a fourth single band antenna arranged at a fourth corner of the base, a fifth single band antenna in planar structure, a sixth single band antenna arranged between the first single band antenna and the third single band antenna; a first isolation component arranged between the second dual-band antenna and the fifth single band antenna; a second isolation component arranged between the second single band antenna and the sixth single band antenna.

18 Claims, 25 Drawing Sheets

ANTENNA SYSTEM AND ELECTRONIC DEVICE

FIELD

The present disclosure relates to a technical field of wireless communication technology, in particular to an antenna system and electronic device.

BACKGROUND

The development of Wireless Local Area Networks (WLAN) is most widespread with the Wi-Fi protocol developed by the Wi Fi Alliance. The development of the Wi-Fi protocol has evolved from IEEE 802.11a, b, g, n, ax to the upcoming 802.11be, also known as Wi Fi 7, which has made great progress in bandwidth and throughput usage. However, when using such electronic devices in application scenarios such as at airports or in commercial buildings, there are problems such as low isolation, high noise interference, uneven signal coverage, and blind spots in reception.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
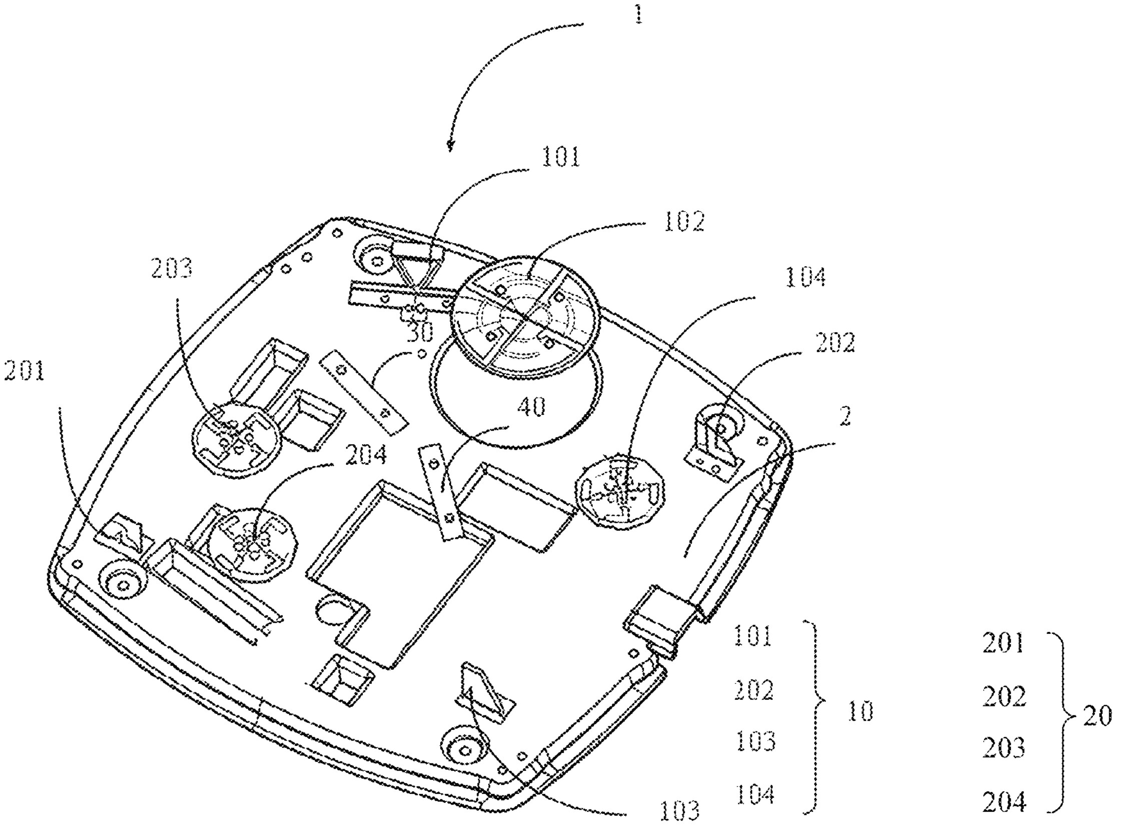
FIG. 1 is a schematic diagram of an optional structure of an antenna system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to “an” or “one” embodiment in this disclosure are not necessarily to the same embodiment, and such references mean “at least one”.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a schematic diagram of an optional structure of an antenna system 1 of the present disclosure. The antenna system 1 is mainly used for wireless switch electronic devices, such as AP (Access Point). In the embodiment, the antenna system 1 is installed on a base 2. The antenna system 1 may include a first group of MIMO (Multiple Input Multiple Output) antennas 10, a second group of MIMO antennas 20, a first isolation component 30, and a second isolation component 40. The first group of MIMO antennas 10 and the second group of MIMO antennas 20 are mainly used for WiFi communication.

The first group of MIMO antennas 10 includes a first dual-band antenna 101, a second dual-band antenna 102, a first single band antenna 103 and a second single band antenna 104. The first dual-band antenna 101 is provided with a high-frequency resonance structure Z1 perpendicular to the base 2 and arranged at a first corner of the base 2.

Figure 2:
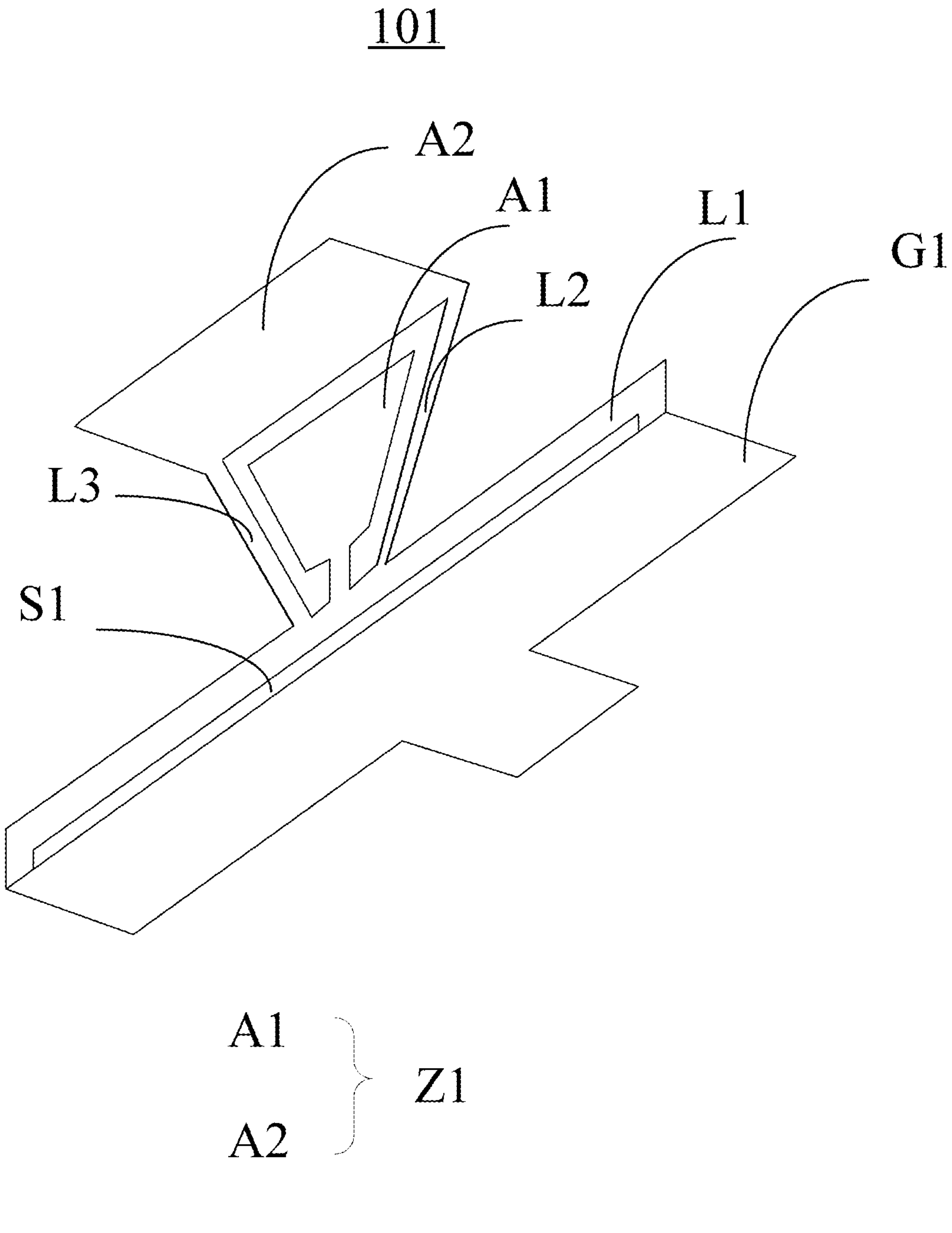
FIG. 2 is a schematic diagram of an optional structure of the first dual-band antenna of the antenna system of the present disclosure.

Specifically, combined with FIG. 2, FIG. 2 is a schematic diagram of an optional structure of the first dual-band antenna 101 of the antenna system 1 of the present disclosure. The first dual-band antenna 101 operates in 2.4G and 5G frequency bands. As shown in FIG. 2, the first dual-band antenna 101 includes a first grounding structure G1, a first connecting part A1 and a high-frequency resonance structure Z1. The first grounding structure is in a convex shape and arranged on the base 2. The first connecting part L1 is in a Π-shaped shape, vertically connected to the first grounding structure G1, and forming a first narrow gap S1 with the first grounding structure G1. The high-frequency resonance structure Z1 includes a first part A1 and a second part A2. The first part A1 is in a trapezoid shape and vertically connected to the first connecting part L1. The second part A2 is in a long strip shape, and one side of the second part A2 is connected to the first connecting part L1 through the second connecting part L2 and the third connecting part L3. The second part A2, the second connecting part L2, and the third connecting part L3 all have a gap with the first part A1.

The second dual-band antenna 102 operates in 2.4G and 5G frequency bands. The second dual-band antenna 102 is a planar structure parallel to the base 2, and the second dual-band antenna 102 is arranged on a first side of the base 2 and adjacent to the first dual-band antenna 102. Specifically, combined with FIG. 3, FIG. 3 is a schematic diagram of an optional structure of the second dual-band antenna 102 of the antenna system 1 of the present disclosure.

Figure 3:
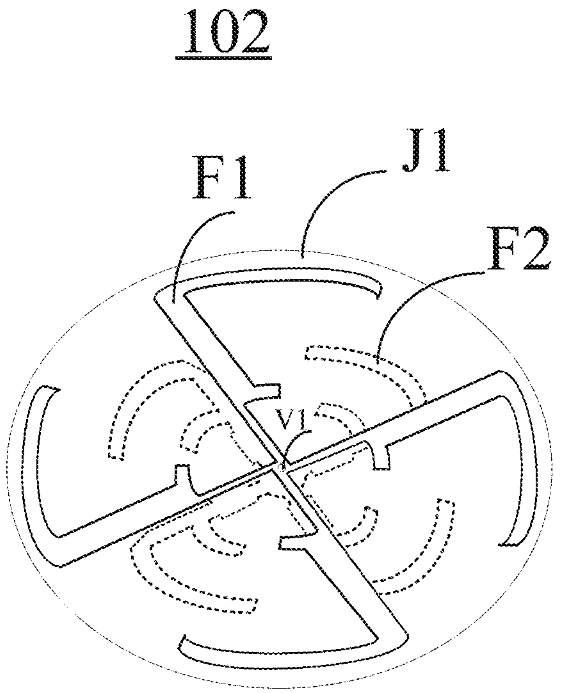
FIG. 3 is a schematic diagram of an optional structure of the second dual-band antenna of the antenna system of the present disclosure.

As shown in FIG. 3, the second dual-band antenna 102 is arranged on a first substrate J1, and the first substrate J1 is parallel to the base 2 and is fixed on the base 2 by a plastic column in a hot melt manner. In other embodiments, the first substrate J1 can also be fixed on the base 2 by a support column with a preset height, not limited herein. The second dual-band antenna 102 includes first up windmill radiation patches F1 and first down windmill radiation patches F2. In the embodiment, four first up windmill radiation patches and four first down windmill radiation patches are taken as examples, but not limited.

In the embodiment, the four first up windmill radiation patches F1 are arranged on an upper surface of the first substrate J1 and symmetrically distributed on a first circumference. The four first down windmill radiation patches F2 are arranged on a lower surface of the first substrate J1 and symmetrically distributed on a second circumference. A radius of the first circumference is greater than a radius of the second circumference and there is a first through-hole V1 between the first circumference and the second circumference. A positive wire of a transmission line (not shown in the figure) passes through the first through-hole V1 to connect the first up windmill radiation patches F1, and a negative wire of the transmission line is connected to the first down windmill radiation patches F2. Wind blades of the first up windmill radiation patches F1 and Wind blades of the first down windmill radiation patches F2 are mirrored, and the blade connecting rod of the first up windmill radiation patches F1 and the blade connecting rod of the first down windmill radiation patches F2 coincide in the projection of the first substrate J1. Specifically, each first up windmill radiation patches F1 and each first down windmill radiation patches F2 are in an F-shaped shape, and an orientation of the first up windmill radiation patches F1 is different from an orientation of the first down windmill radiation patches F2. The second dual-band antenna 102 adopts a mirror windmill radiation patch design with four equal directional structures, which makes the antenna radiation field of the second dual-band antenna 102 isotropic and avoids blind spots in reception.

In the embodiment, the first single band antenna 103 operates in 5G frequency band. The first single band antenna 103 is vertically arranged at a second corner of the base 2, and the first corner and the second corner are diagonal.

In the embodiment, the second single antenna 104 operates in 5G frequency band. The second single band antenna 104 is a planar structure parallel to the base 2, and the second single band antenna 104 is arranged on a second side of the base 2 and adjacent to the first single band antenna 103. The first dual-band antenna 101 and the first single band antenna 103 are vertically polarized antennas, and the second dual-band antenna 102 and the second single band antenna 104 are horizontally polarized antennas. Antennas of the first group of MIMO antennas 10 are polarized orthogonally in pairs to avoid blind spots in reception.

In the embodiment, the second group of MIMO antennas 20 includes a third single band antenna 201, a fourth single band antenna 202, a fifth single band antenna 203 and a sixth single band antenna 204. The third single band antenna 201, the fourth single band antenna 202, the fifth single band antenna 203 and the sixth single band antenna 204 are operates in 6G frequency band. The third single band antenna 201 is vertically arranged in a third corner of the base 2. The fourth single band antenna 202 is vertically arranged at a fourth corner of the base 2 and adjacent to the second single band antenna 104, and the third corner and the fourth corner are diagonal. The fifth single band antenna 203 is a planar structure parallel to the base 2, and is arranged between the first dual-band antenna 101 and the third single band antenna 201. The sixth single band antenna 204 is a planar structure parallel to the base 2, and is arranged between the first single band antenna 103 and the third single band antenna 201. The third single band antenna 201 and the fourth single band antenna 202 are vertically polarized antennas, and the fifth band antenna 203 and the sixth single band antenna 204 are horizontally polarized antennas. Antennas of the second group of MIMO antennas 20 are polarized orthogonally in pairs to avoid blind spots in reception.

Figure 4:
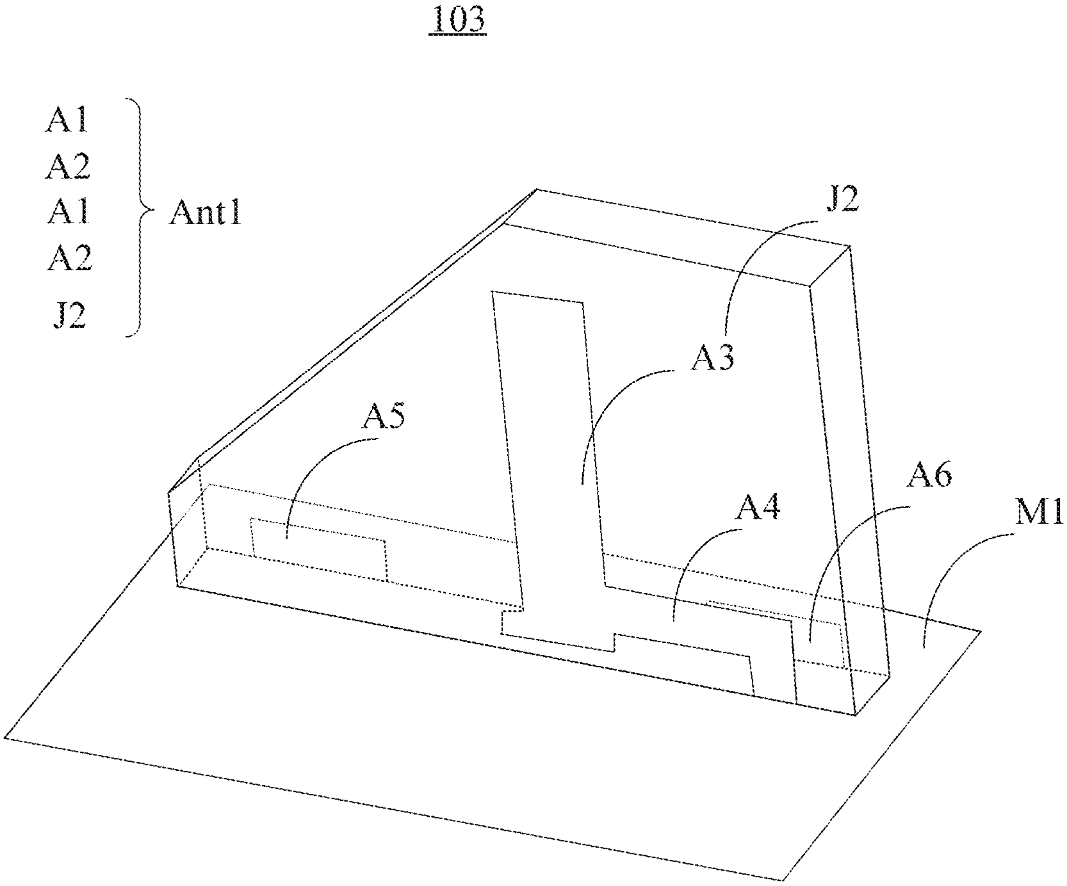
FIG. 4 is a schematic diagram of an optional structure of the first single band antenna of the antenna system of the present disclosure.

In the embodiment, structures of the first single band antenna 103, the third single band antenna 201, and the fourth single band antenna 202 are the same. Tanking the first single band antenna 103 as an example. Specifically, combined with FIG. 4, FIG. 4 is a schematic diagram of an optional structure of the first single band antenna 103 of the antenna system 1 of the present disclosure. As shown in FIG. 4, the first single band antenna 103 includes a metal sheet M1 and a planar inverted F antenna Ant1. The a planar inverted F antenna Ant1 is printed on a second substrate J2, and the second substrate J2 is vertically fixed on the metal sheet M1. The planar inverted F antenna Ant1 includes a third part A3, a fourth part A4, a fifth part A5, a sixth part A6. The third part A3 is in a long strip shape and arranged on a first side of the second substrate J2. The fourth part A4 is in a ¬-shaped shape, and one end of the fourth part A4 is vertically connected to one end of the third part A3, and the other end of the fourth part A4 is perpendicular to the second substrate J2. The fifth part A5 is in a long strip shape and arranged on a second side of the second substrate J2. The sixth part A6 is in a long strip shape and arranged on the second side of the second substrate J2, and projections of the fifth part A5 and the sixth part A6 on the first side of the second substrate J2 are respectively distributed on two sides of the third part A3. It can be understood that in other embodiments of the present disclosure, sizes of the first single band antenna 103, the third single band antenna 201, and the fourth single band antenna 202 can be adjusted according to actual applications. For example, sizes of the metal substrate M1 and planar inverted F antenna Ant1 of the first single band antenna 103, the third single band antenna 201, and the fourth single band antenna 202 can be the same or different, and thickness of the second substrate J2 can be the same or different, and not limited.

Figure 5:
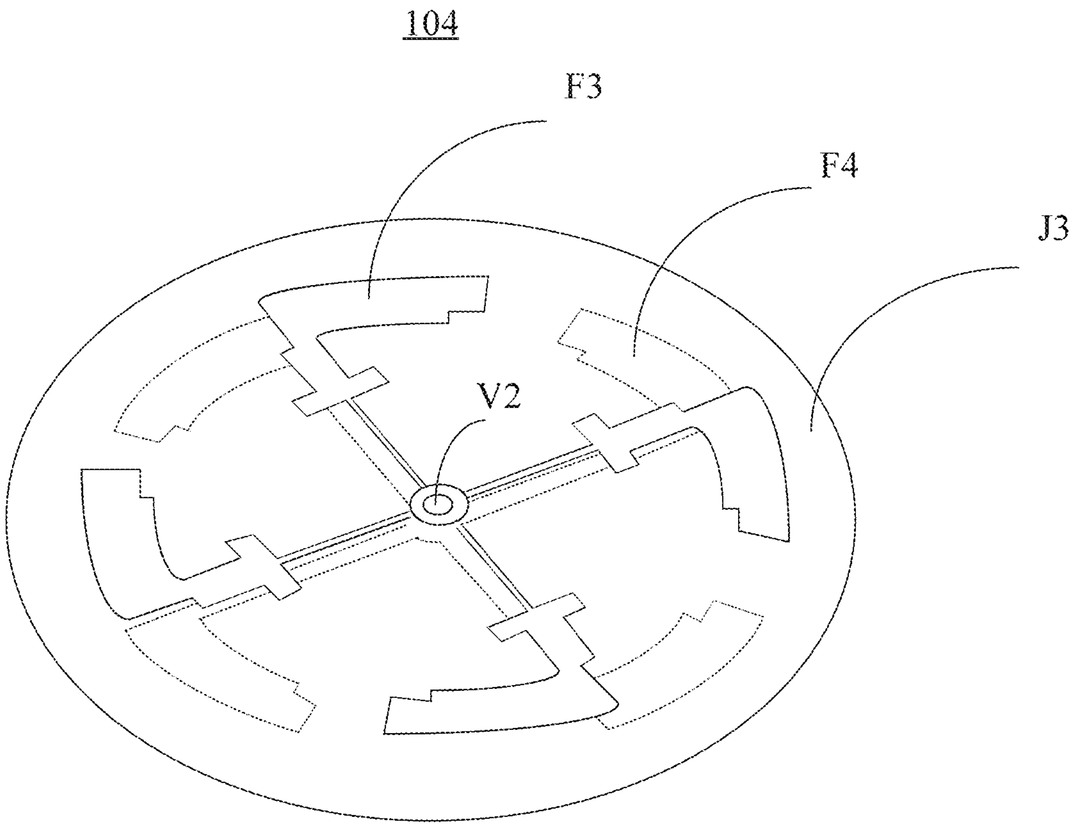
FIG. 5 is a schematic diagram of an optional structure of the second single band antenna of the antenna system of the present disclosure.

In the embodiment, structures of the second single band antenna 104, the fifth single band antenna 203 and the sixth single band antenna 204 are the same and respectively arranged on a third substrate J3. Taking the second single bans antenna 104 as an example. Specifically, combined with FIG. 5, FIG. 5 is a schematic diagram of an optional structure of the second single band antenna 104 of the antenna system 1 of the present disclosure. The second single band antenna 104 is installed on the third substrate J3, and the third substrate J3 can be fixed to the base 2 by screws and parallel to the base 2. The second single band antenna 104 includes the second up windmill radiation patch F3 and the second down windmill radiation patch F4. In the embodiment, taking four second up windmill type radiation patches and four second down windmill radiation patches as an example, but not limited to this. It can be understood that in other embodiments of the present disclosure, sizes of the second single band antenna 104, the fifth single band antenna 203, and the sixth single band antenna 204 can be adjusted according to actual applications. For example, lengths of the second up windmill type radiation patches F3 and the second down windmill radiation patches F4 of the second single band antenna 104, the fifth single band antenna 203 and the sixth single band antenna 204, as well as a thickness of the third substrate J3, can be the same or different, and are not limited here.

In the embodiment, the four second up windmill radiation patches F3 are arranged on an upper surface of the third substrate J3, and symmetrically distributed on a third circumference. The four second down windmill radiation patches F4 are arranged on a lower surface of the third substrate J3, and symmetrically distributed on a fourth circumference. A radius of the third circumference is same as a radius of the fourth circumference. There is a second through-hole V2 between the third circumference and the fourth circumference. A positive wire of a transmission line (not shown in the figure) passes through the second through-hole V1 to connect the second up windmill radiation patches F3, and a negative wire of the transmission line is connected to the second down windmill radiation patches F4. Wind blades of the second up windmill radiation patches F3 and Wind blades of the second down windmill radiation patches F4 are mirrored, and the blade connecting rod of the second up windmill radiation patches F3 and the blade connecting rod of the second down windmill radiation patches F4 coincide in the projection of the third substrate J3. Specifically, each second up windmill radiation patch F3 and each second down windmill radiation patch F4 are in a 7-shaped shape, and an orientation of the second up windmill radiation patches F3 is different from an orientation of the second down windmill radiation patches 4. The mirror windmill radiation patch design with four equal directional structures ensures that the radiation field of the first single band antenna 103, the third single band antenna 201, and the fourth single band antenna 202 have isotropy, thereby avoiding blind spots in reception.

In the embodiment, the first isolation component 30 is in a long strip shape and arranged between the second dual-band antenna 13 the fifth single band antenna 203. The second isolation component 40 is in a long strip shape and arranged between the second single band antenna 104 and the sixth single band antenna 204.

In the embodiment, the second dual-band antenna 102 is parallel to the base 2 and fixed on the base 2 by a plastic column in the hot melt manner. In other embodiment, the second dual-band antenna 102 can also be fixed on the base 2 by a support column with a preset height, so that the second dual-band antenna 102 is higher than the other antennas, and the isolation between the antennas is improved.

In the embodiment, the first dual-band antenna 101 and the first single band antenna 103 are configured at a diagonal corner of the base 2, while the third single band antenna 201 and the fourth single band antenna 202 are configured at another diagonal corner of the base 2, resulting in an isolation degree of over 30 dB between the antennas.

In the embodiment, the first isolation component 30 is arranged between the second dual-band antenna 102 and the fifth single band antenna 203, and the second isolation component 40 is arranged between the second single band antenna 104 and the sixth single band antenna 204 to achieve an isolation degree of over 30 dB between the antennas.

Figure 6:
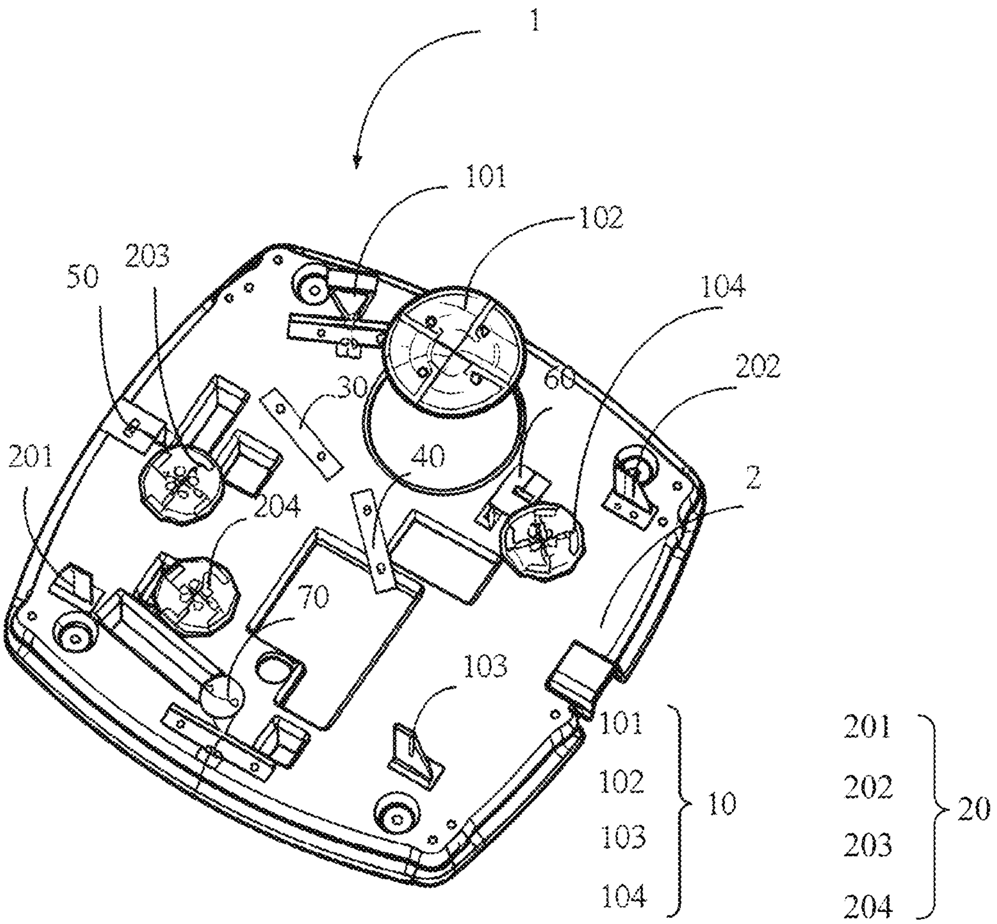
FIG. 6 is a schematic diagram of an optional structure of the antenna system of the present disclosure.

Referring to FIG. 6, FIG. 6 is a schematic diagram of an optional structure of the antenna system 1 of the present disclosure. The antenna system 1 is mainly used for wireless switch electronic devices, such as AP (Access Point). In the embodiment, the antenna system 1 is installed on the base 2 and the antenna system 1 includes a first group of MIMO antennas 10, a second group of MIMO antennas 20, a first isolation component 30, a second isolation component 40, a first AUX (Auxiliary) antenna 50, a second AUX antenna 60, and an IoT (Internet of Things) antenna 70. The first AUX antenna 50 and the second AUX antenna 60 operate in the 2.4G, 5G, and 6G frequency bands, while the IoT antenna 70 operates in the 2.4G frequency band. The structure and principle of the first group of MIMO antennas 10, the second group of MIMO antennas 20, the first isolation component 30, and the second isolation component 40 are similar to the above embodiments, and will not be repeated here.

In the embodiment, the first AUX antenna 50 is arranged on a side of the fifth single band antenna 203, and the second AUX antenna 60 is arranged on a side of the second single band antenna 104. The first AUX antenna 50 and the second AUX antenna 60 are mainly used to detect whether there are other available Wi-Fi signals in adjacent areas, and the distance between the first AUX antenna 50 and the second AUX antenna 60 is greater than 60 mm to achieve spatial diversity and field type diversity.

Figure 7:
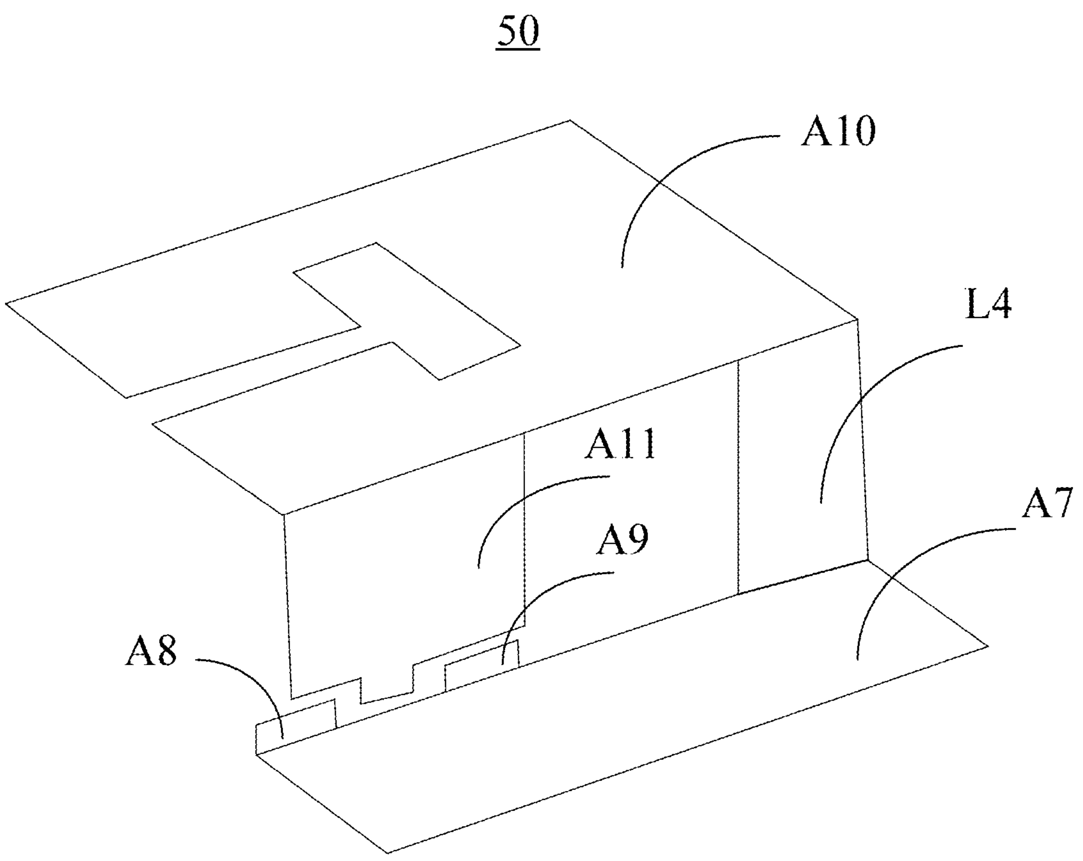
FIG. 7 is an optional structural schematic diagram of the first AUX antenna of the antenna system of the present disclosure.

Specifically, combined with FIG. 7, FIG. 7 is an optional structural schematic diagram of the first AUX antenna 50 of the antenna system 1 of the present disclosure. The structure of the first AUX antenna 50 and the second AUX antenna 60 are the same. In the embodiment, taking the first AUX antenna 50 as an example. The first AUX antenna includes a seventh part A7, an eighth part A8, a ninth part A9, a tenth part A10, an eleventh part A11 and a fourth connecting part L4. The seventh part A7 is in a long strip shape and fixed to the base 2, and one end of one side of the seventh part A7 is vertically connected to the eighth part A8 and the ninth part A9. One end of the fourth connecting part L4 is vertically electrically connected to the other end of one side of the seventh part A7. The tenth part A10 is in a long strip shape and provided with a T-shaped slot, and the tenth part A10 is electrically connected to the other end of the fourth connecting part L4. The eleventh part A11 is in a 凸-shaped shape, and one end of the eleventh part A11 is vertically connected to the eighth part A8 and the other end of the eleventh part A11 is suspended. The eighth part A8 and the ninth part A9 are respectively arranged on two sides of the eleventh part A11.

Figure 8:
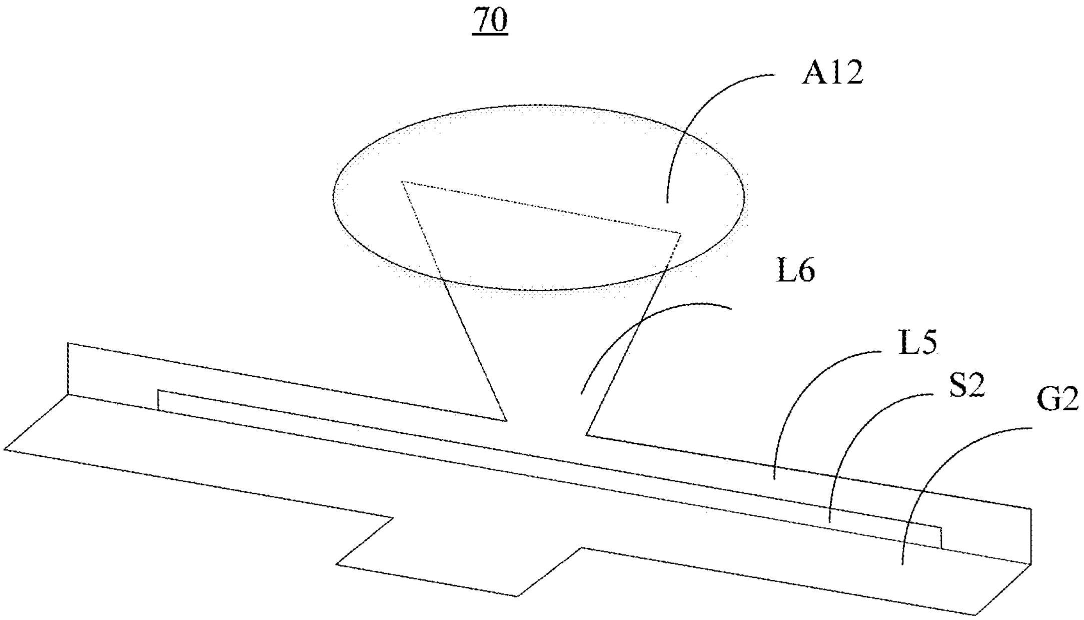
FIG. 8 is a schematic diagram of an optional structure of the IoT antenna of the antenna system of the present disclosure.

In the embodiment, the IoT antenna 70 is arranged between the first single band antenna 103 and the third single band antenna 201. Combined with FIG. 8, FIG. 8 is a schematic diagram of an optional structure of the IoT antenna 70 of the antenna system 1 of the present disclosure. As shown in FIG. 8, the IoT antenna 70 includes a second grounding structure G2, a fifth connecting part L5, a sixth connecting part L6 and a twelfth part A12. The second grounding structure G2 is in a 凸-shaped shape and arranged on the base 2. The fifth connecting part L5 is in a Π-shaped shape and vertically connected to the second grounding structure G2 and forming a second narrow gap S2 with the second grounding structure G2. The sixth connecting part L6 is in a trapezoid shape and vertically connected to a center position of the fifth connecting part L5. The twelfth part A12 is in a disc shape, and a center position of the twelfth part A12 is vertically connected to the sixth connecting part L6. Combined with FIG. 6, the IoT antenna 70 is arranged at an outermost edge of base 2, and a relative position of IoT antenna 70 is precisely matched a highest point in the curved surface of base 2, so that the IoT antenna 70 can have the maximum clearance area.

Figure 9A:
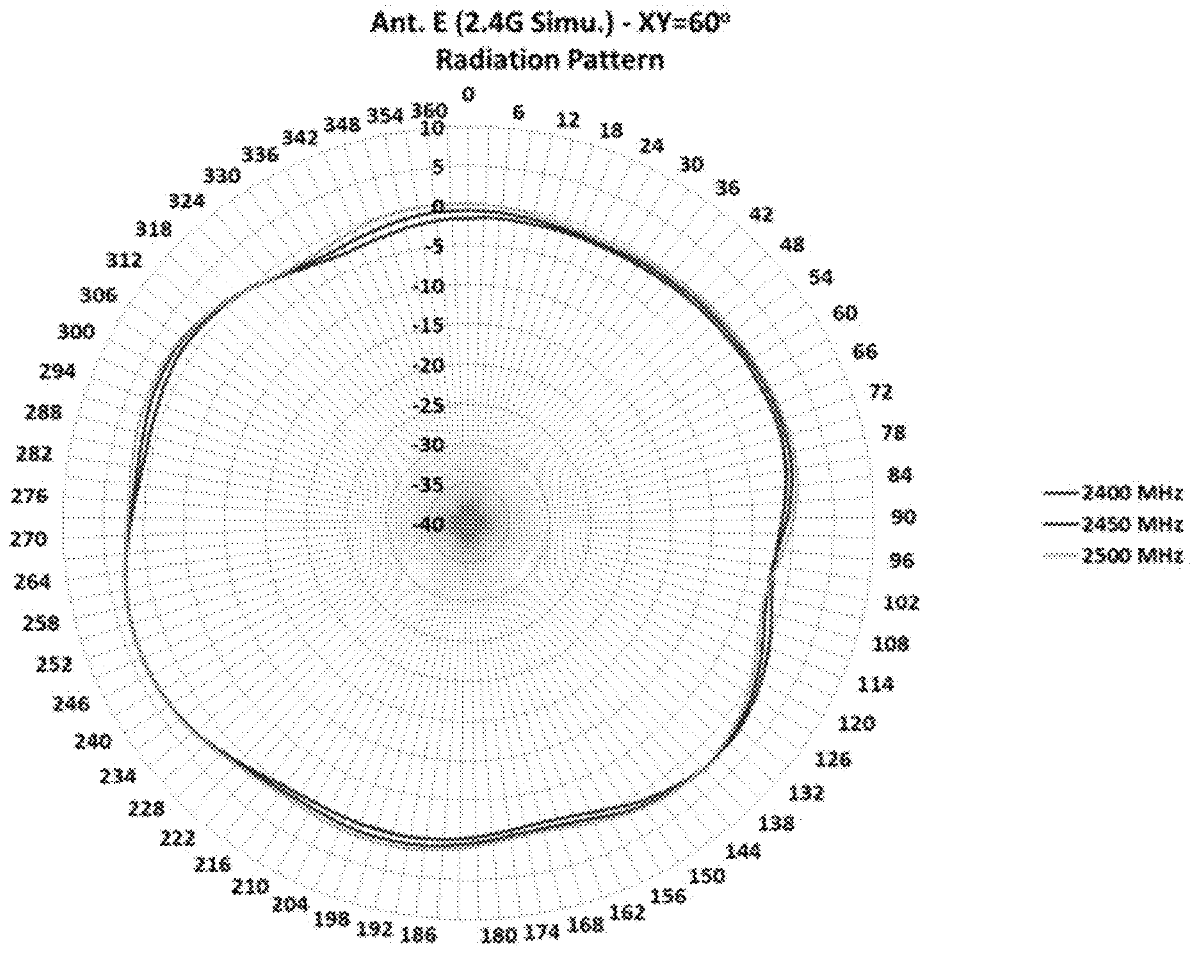
FIG. 9A is a schematic diagram of the isotropic radiation field of the first dual-band antenna on XY−60° plane in the 2.4 G frequency band.
Figure 9B:
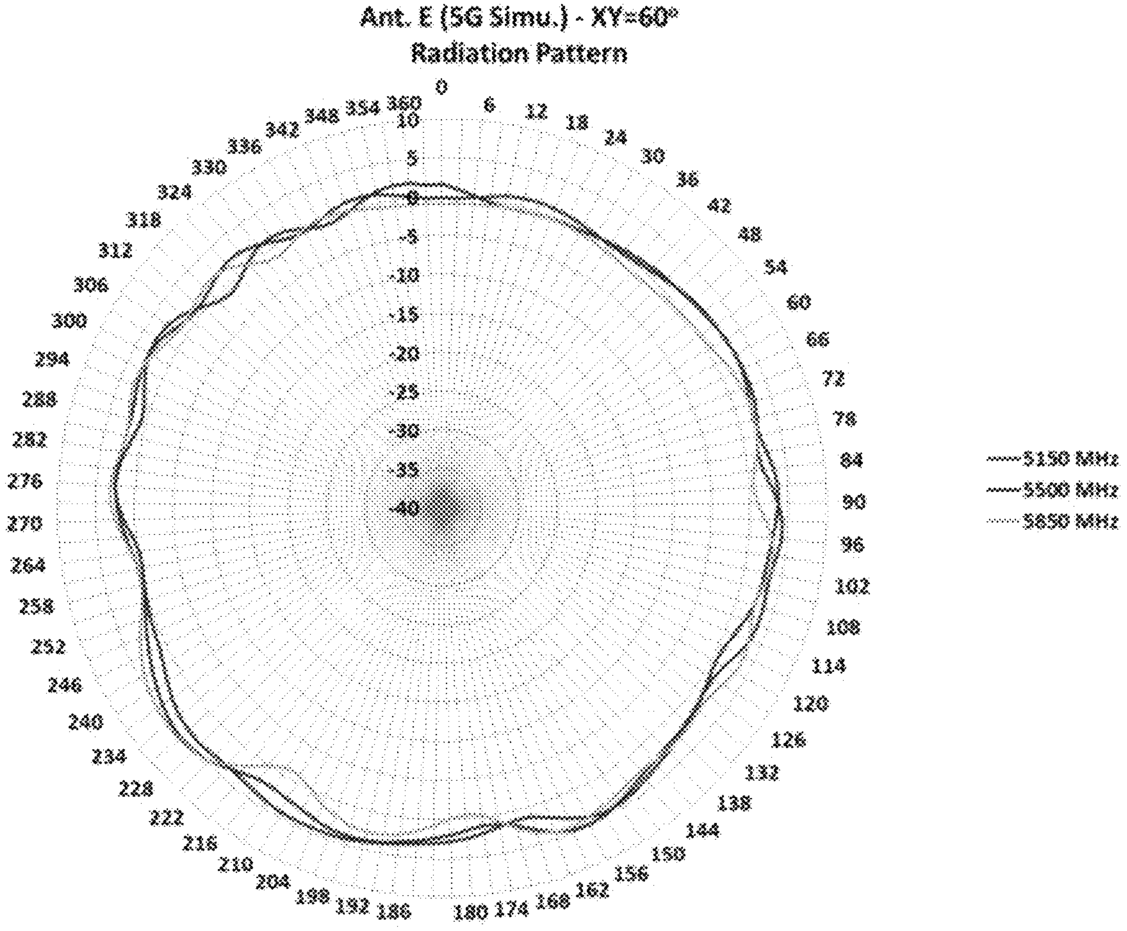
FIG. 9B is a schematic diagram of the isotropic radiation field of the first dual-band antenna on XY−60° plane in the 5 G frequency band.

Referring to FIGS. 9A-9B, FIGS. 9A-9B are schematic diagrams of the isotropic radiation field of the first dual-band antenna 101 on XY-60° plane in the 2.4G frequency band and the 5G frequency band respectively. As shown in the figure, the radiation field is almost circular, and the first dual-band antenna 101 meets the isotropic requirement.

Figure 10A:
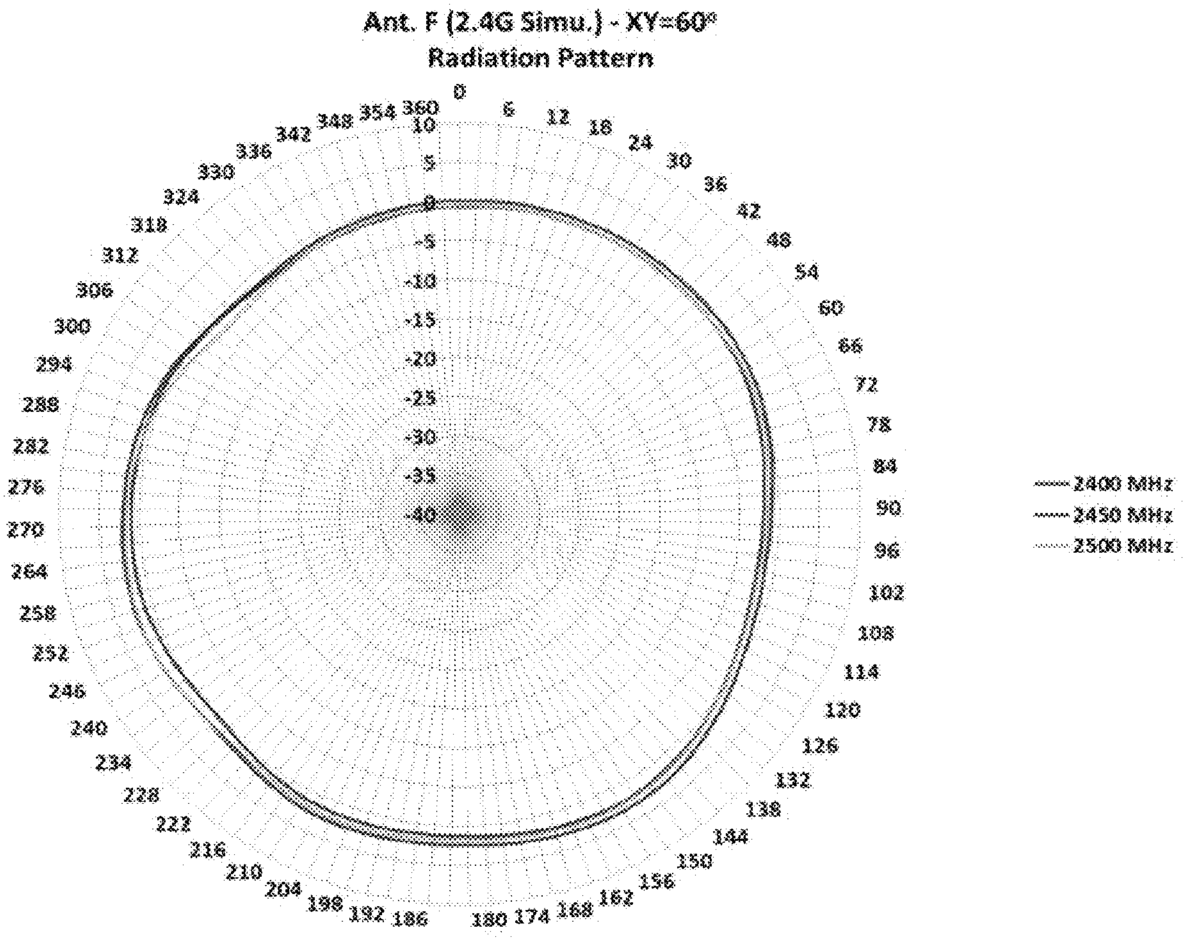
FIG. 10A is a schematic diagram of the isotropic radiation field of the second dual-band antenna on XY−60° plane in the 2.4 G frequency band.
Figure 10B:
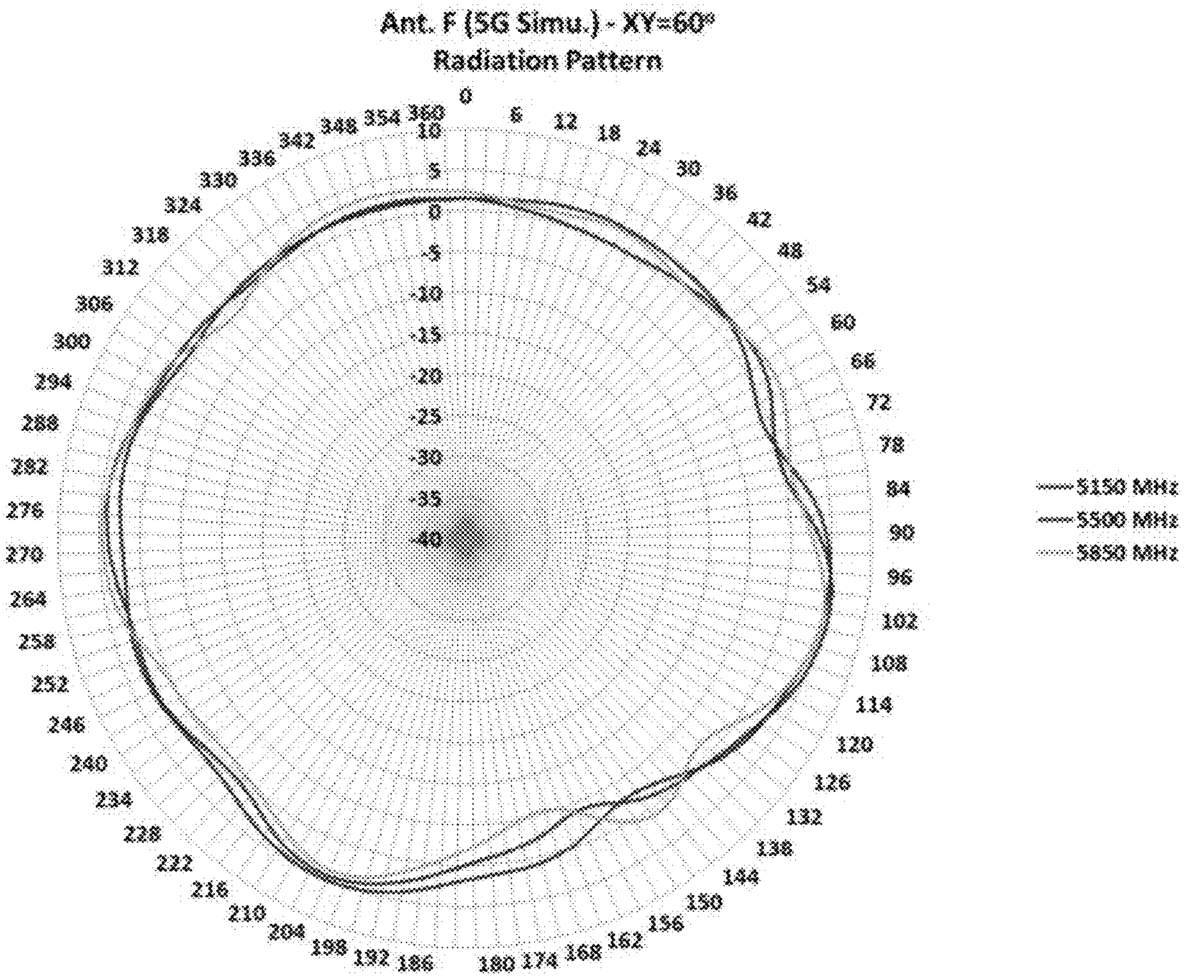
FIG. 10B is a schematic diagram of the isotropic radiation field of the second dual-band antenna on XY−60° plane in the 5 G frequency band.

Referring to FIGS. 10A-10B, FIGS. 10A-10B are schematic diagrams of the isotropic radiation field of the second dual-band antenna 102 on XY−60° plane in the 2.4G frequency band and the 5G frequency band respectively. As shown in the figure, the radiation field is almost circular, and the second dual-band antenna 102 meets the isotropic requirement.

Figure 11:
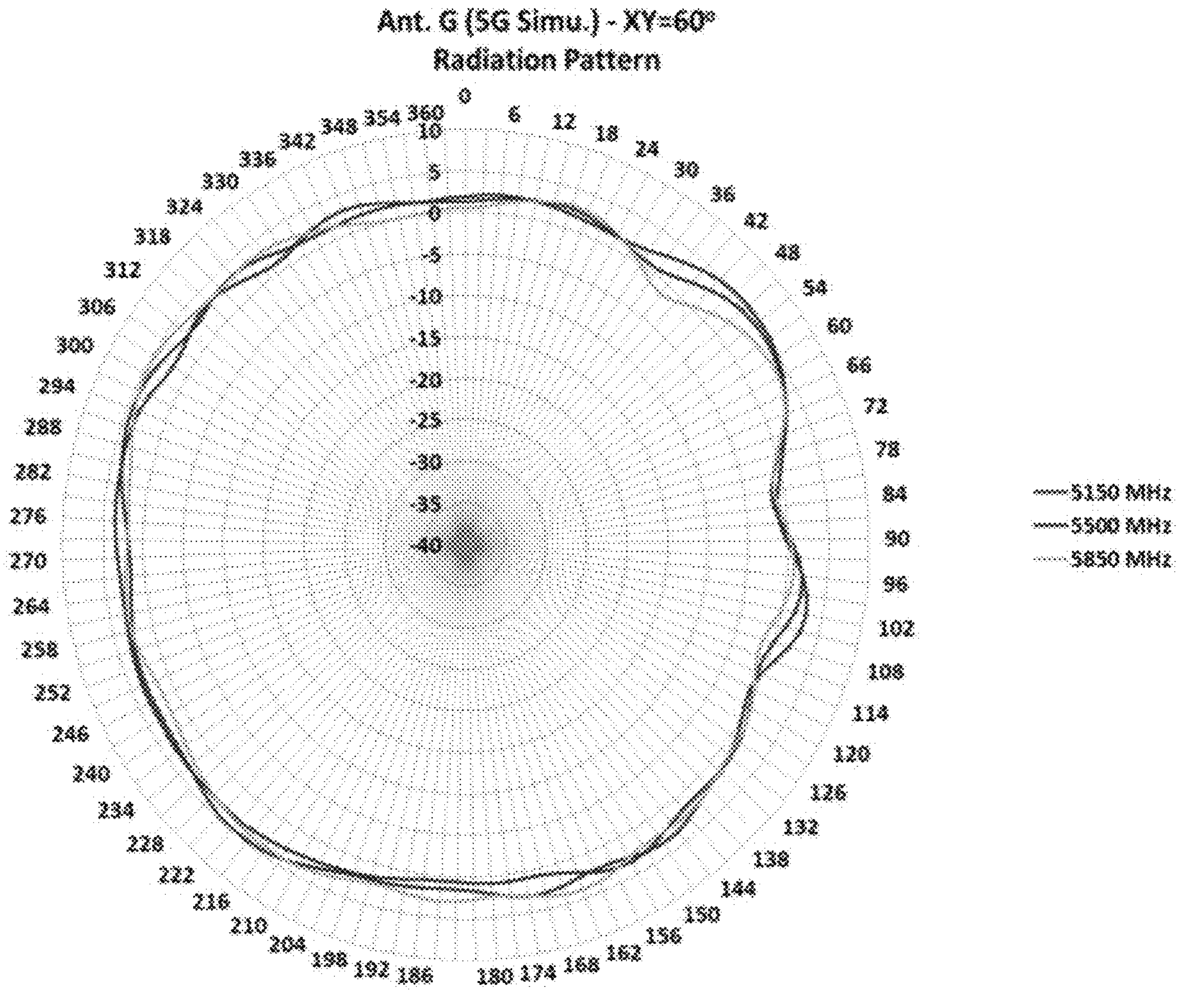
FIG. 11 is a schematic diagram of the isotropic radiation field of the first single band antenna on XY−60° plane in the 5 G frequency band.
Figure 12:
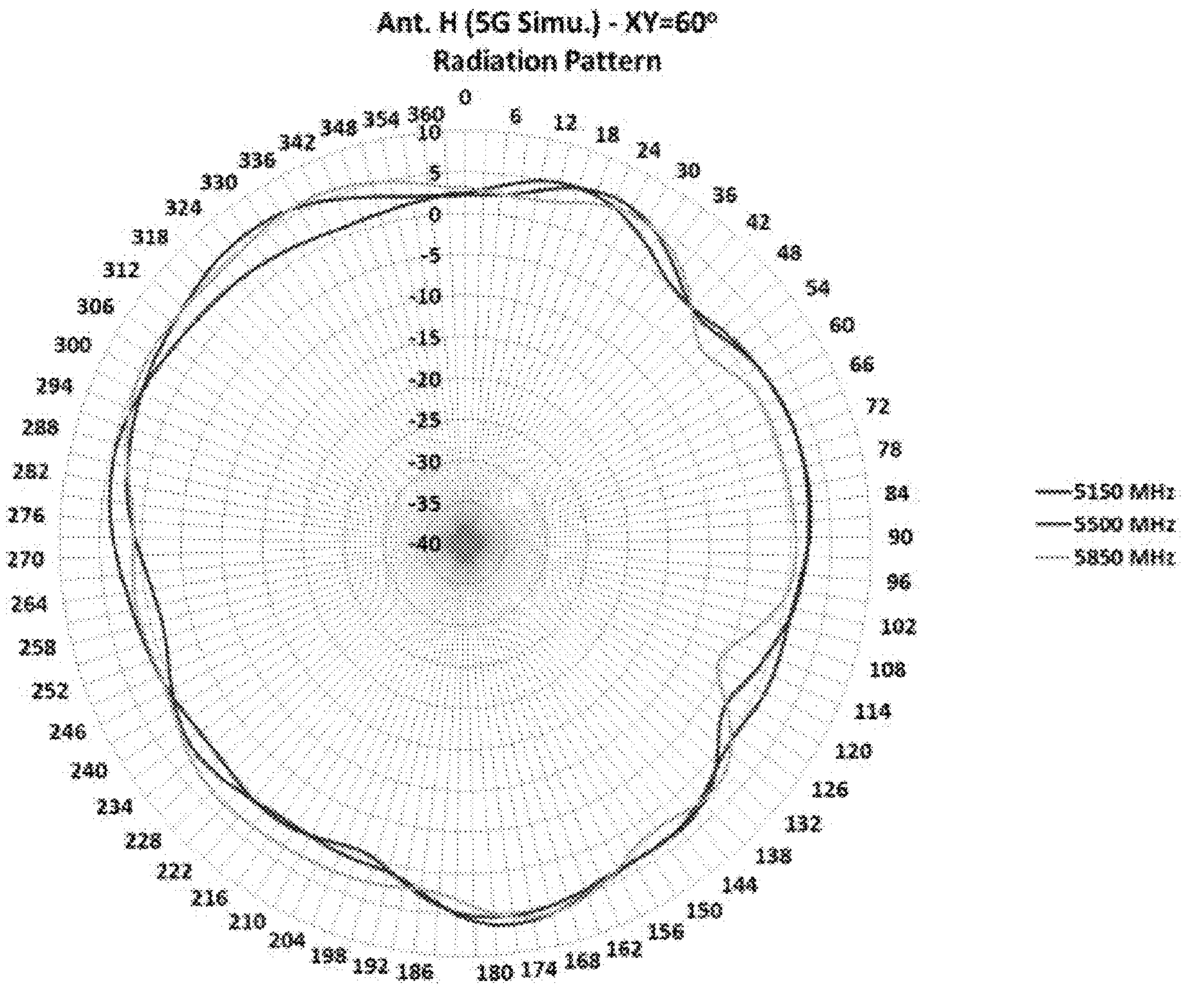
FIG. 12 is a schematic diagram of the isotropic radiation field of the second single band antenna on XY−60° plane in the 5 G frequency band.
Figure 13:
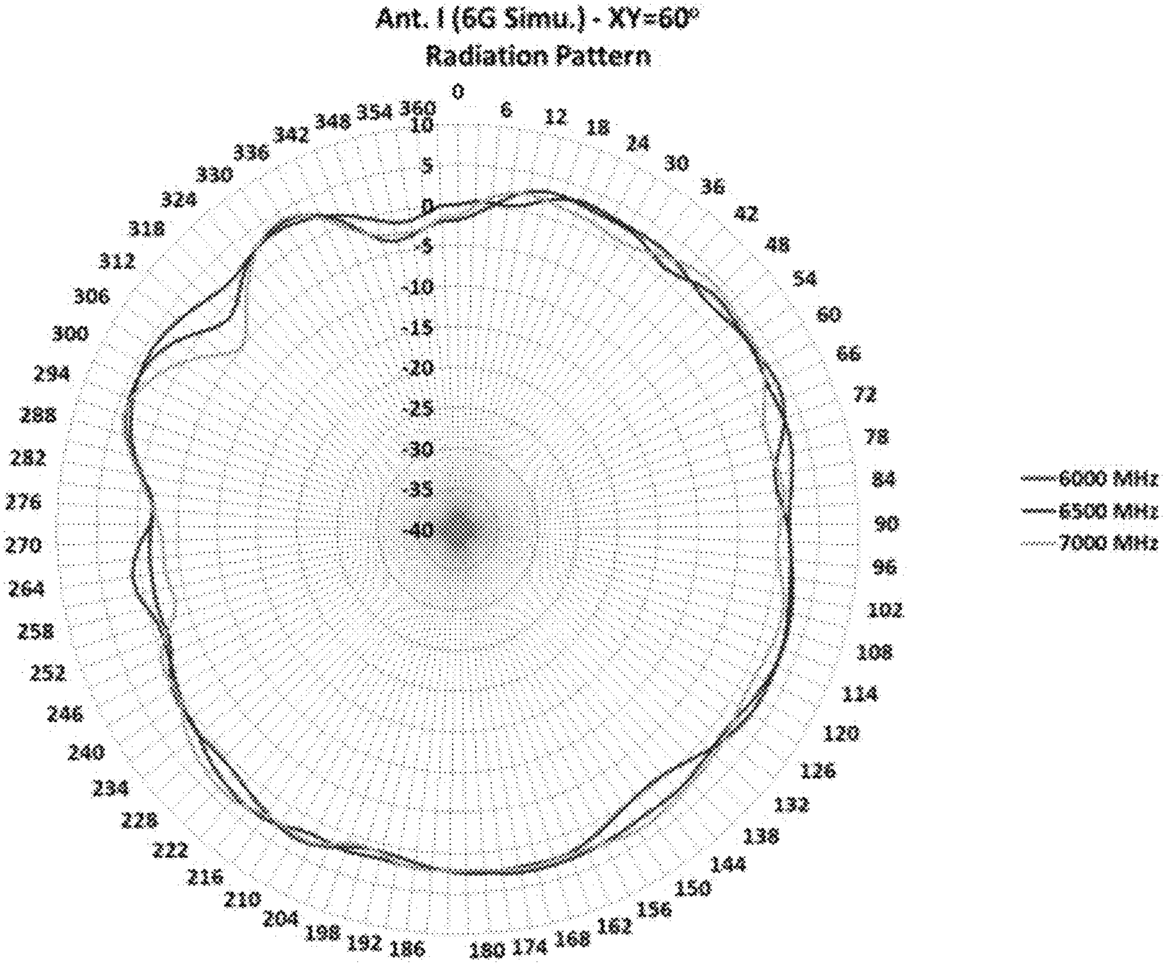
FIG. 13 is a schematic diagram of the isotropic radiation field pattern of the third single band antenna on the XY-60° plane in the 6 G frequency band.
Figure 14:
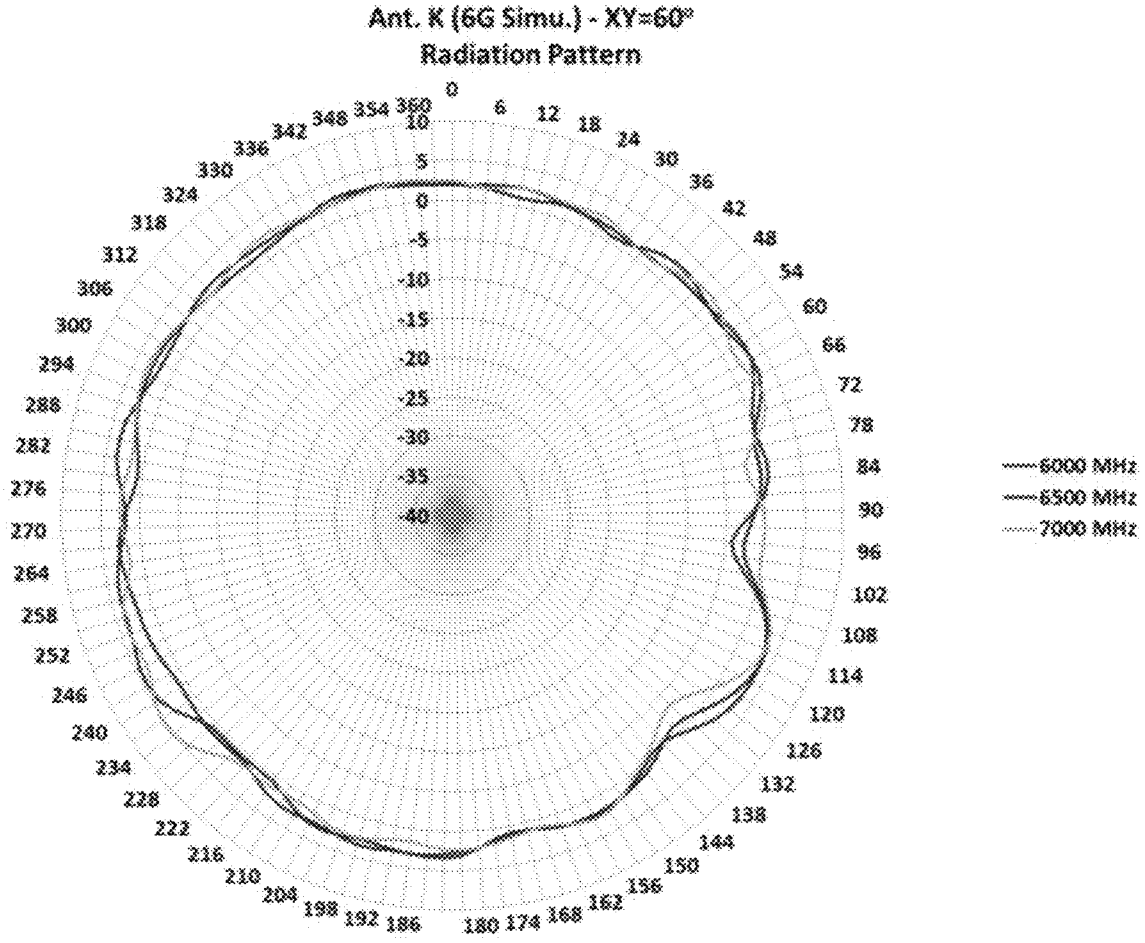
FIG. 14 is a schematic diagram of the isotropic radiation field pattern of the fourth single band antenna on the XY−60° plane in the 6 G frequency band.
Figure 15:
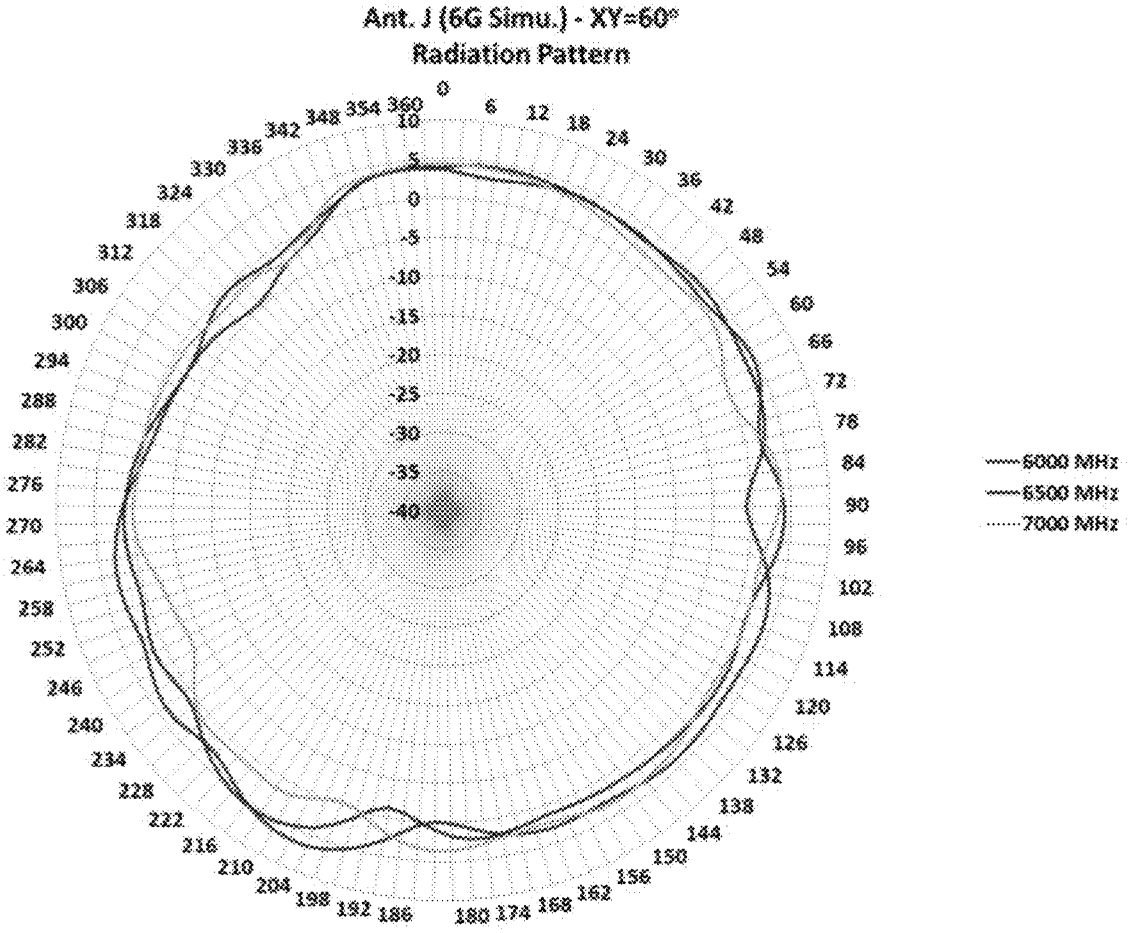
FIG. 15 is a schematic diagram of the isotropic radiation field pattern of the fifth single band antenna on the XY−60° plane in the 6 G frequency band.
Figure 16:
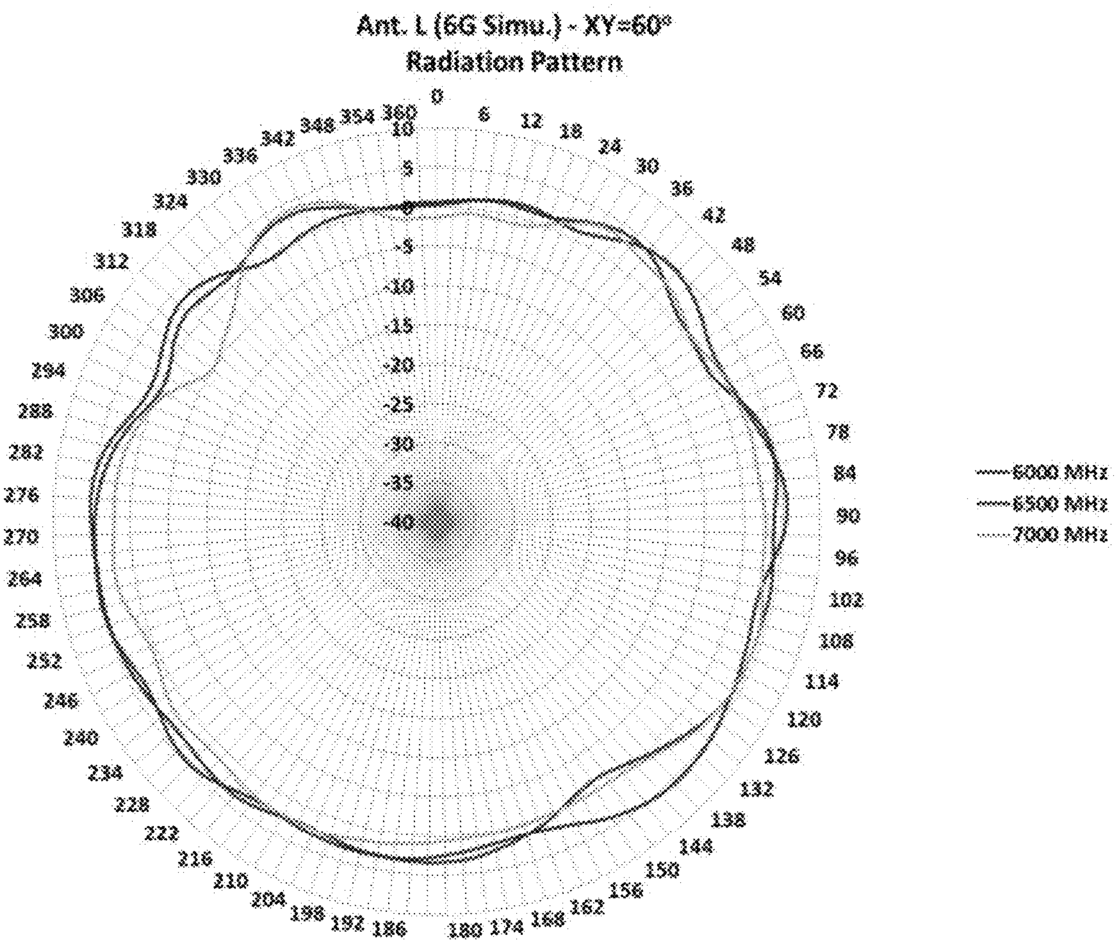
FIG. 16 is a schematic diagram of the isotropic radiation field pattern of the sixth single band antenna on the XY−60° plane in the 6 G frequency band.

Referring to FIGS. 11-12, FIGS. 11-12 are schematic diagrams of the isotropic radiation field of the first single band antenna 103 and the second single band antenna 104 on XY−60° plane in the 5G frequency band respectively. As shown in the figure, the radiation field is almost circular, and the first single band antenna 103 and the second single band antenna 104 meet the isotropic requirement.

Referring to FIGS. 13-16, FIGS. 13-16 are schematic diagrams of the isotropic radiation field pattern of the third single band antenna 201 to the sixth single band antenna 204 on the XY−60° plane in the 6G frequency band respectively. As shown in the figure, the radiation field patterns of the fourth single band antenna 201 to the sixth single band antenna 204 are almost circular, meeting the isotropic requirement.

Figure 17A:
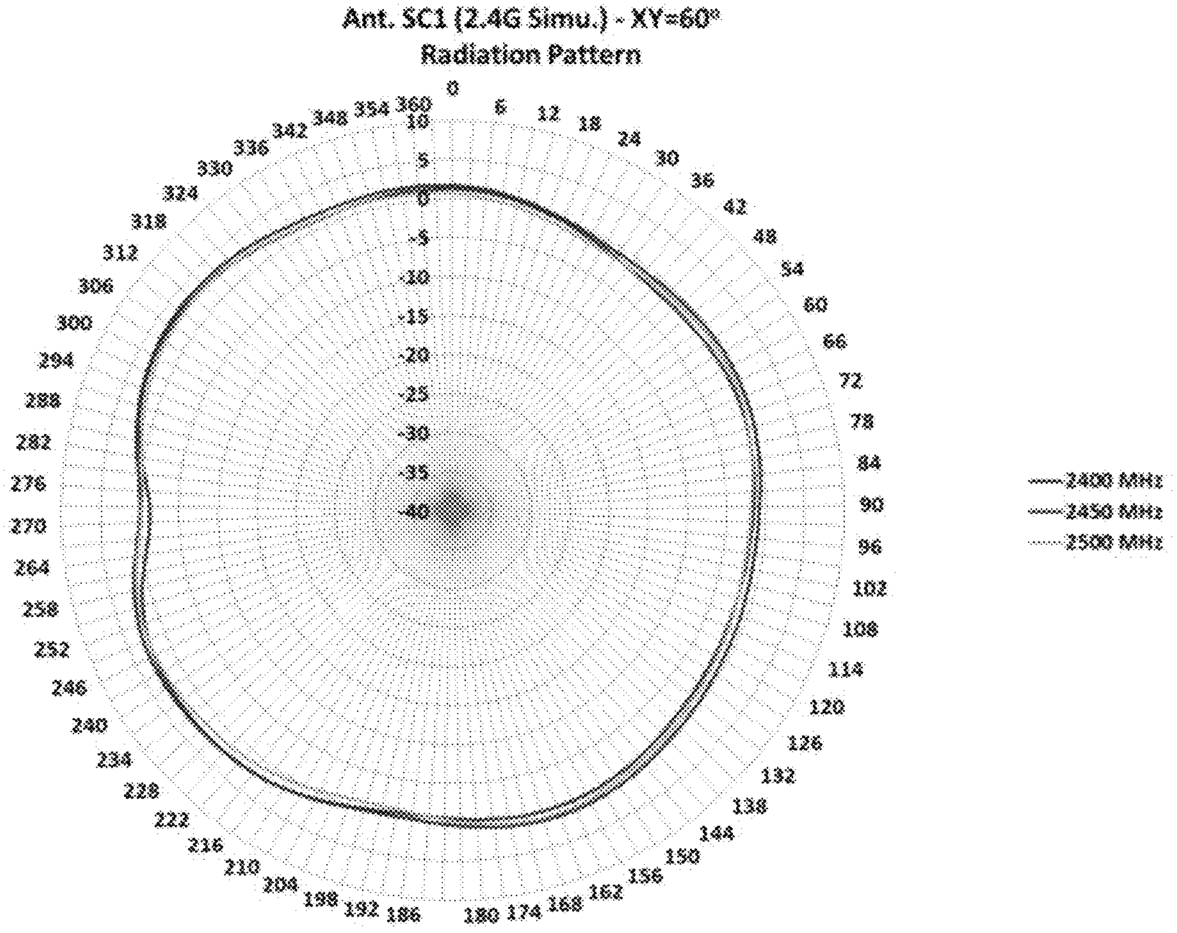
FIG. 17A is a schematic diagram of the isotropic radiation field of the first AUX antenna on XY−60° plane in the 2.4 G frequency band.
Figure 17B:
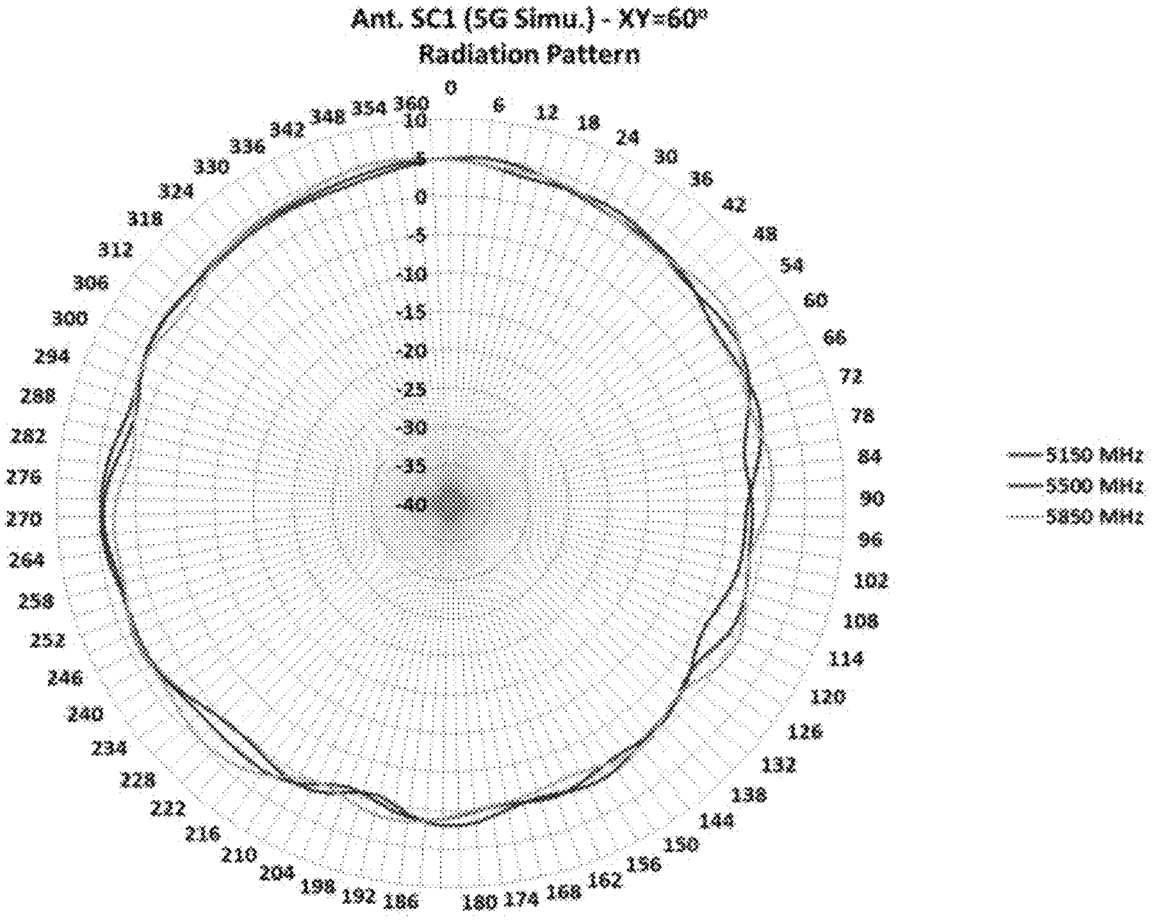
FIG. 17B is a schematic diagram of the isotropic radiation field of the first AUX antenna on XY−60° plane in the 5 G frequency band.
Figure 17C:
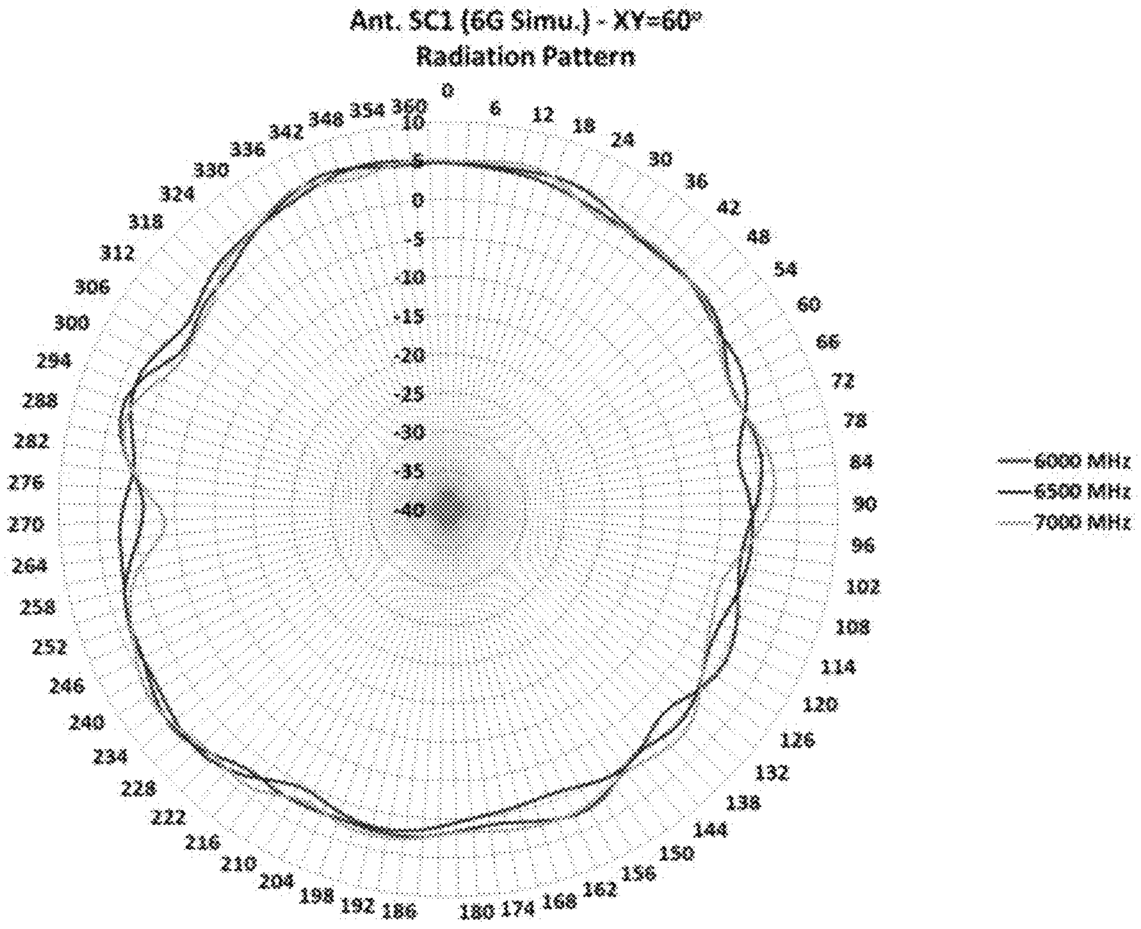
FIG. 17C is a schematic diagram of the isotropic radiation field of the first AUX antenna on XY−60° plane in the 6 G frequency band.

Referring to FIGS. 17A-17C, FIGS. 17A-17C are schematic diagrams of the isotropic radiation field of the first AUX antenna 50 on XY-60° plane in the 2.4G frequency band, the 5G frequency band and 6G frequency band respectively. As shown in the figure, the radiation field is almost circular, and the first AUX antenna 50 meets the isotropic requirement.

Figure 18A:
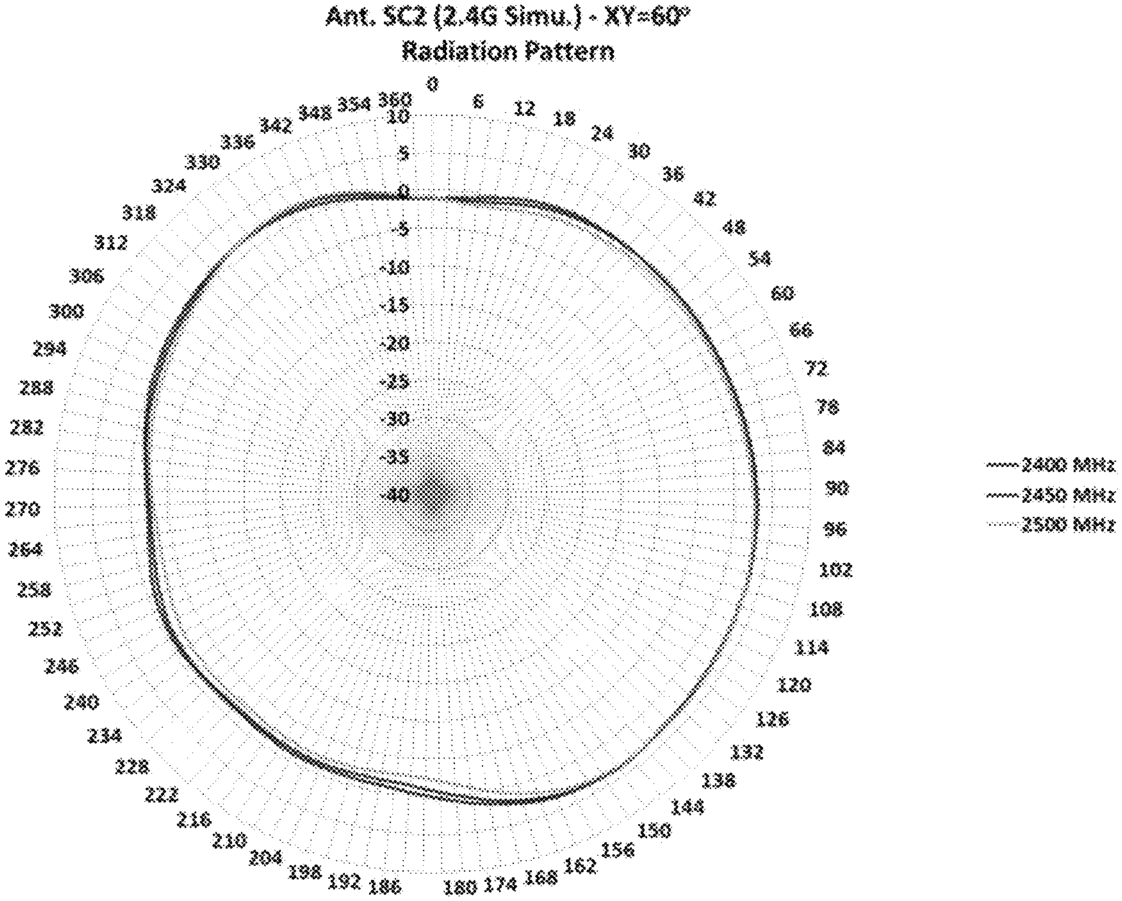
FIG. 18A is a schematic diagram of the isotropic radiation field of the second AUX antenna on XY−60° plane in the 2.4 G frequency band.
Figure 18B:
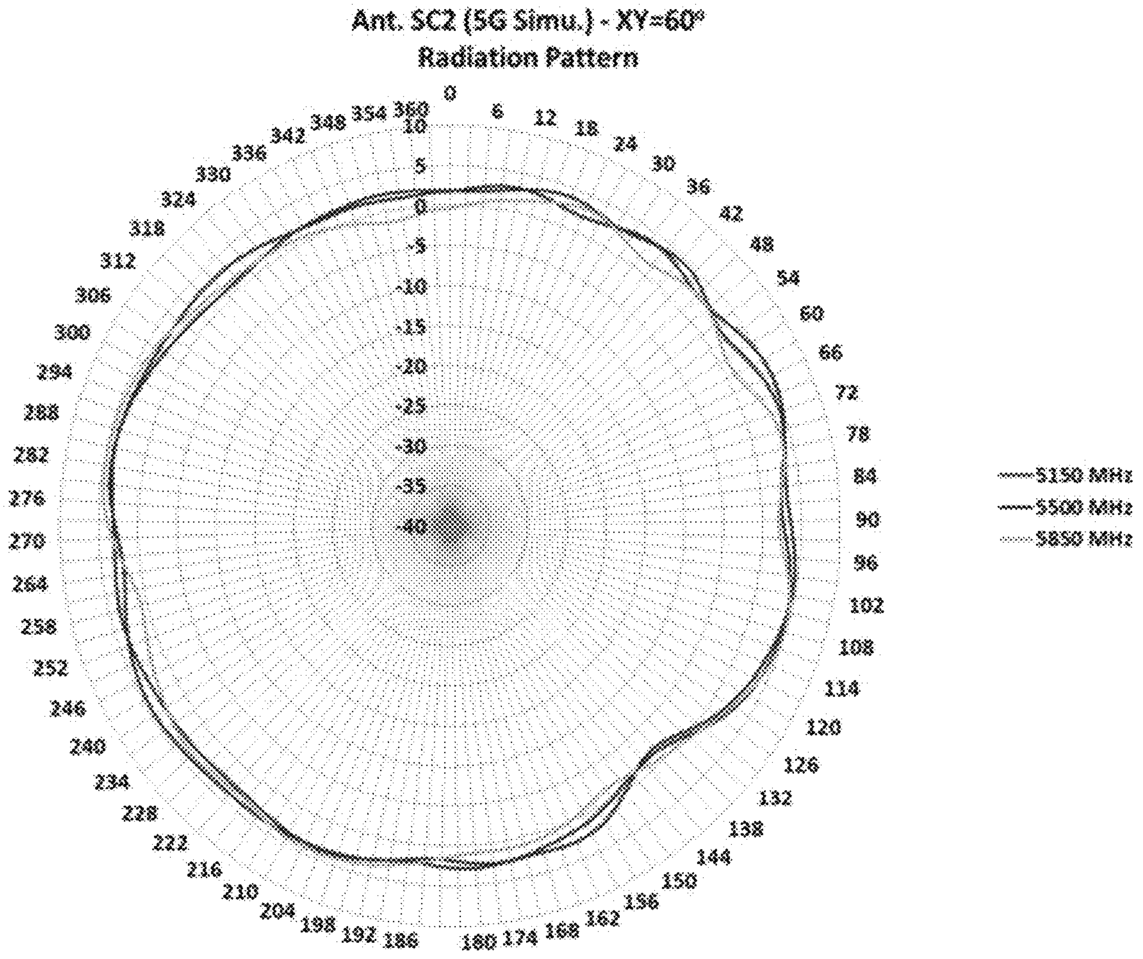
FIG. 18B is a schematic diagram of the isotropic radiation field of the second AUX antenna on XY−60° plane in the 5 G frequency band.
Figure 18C:
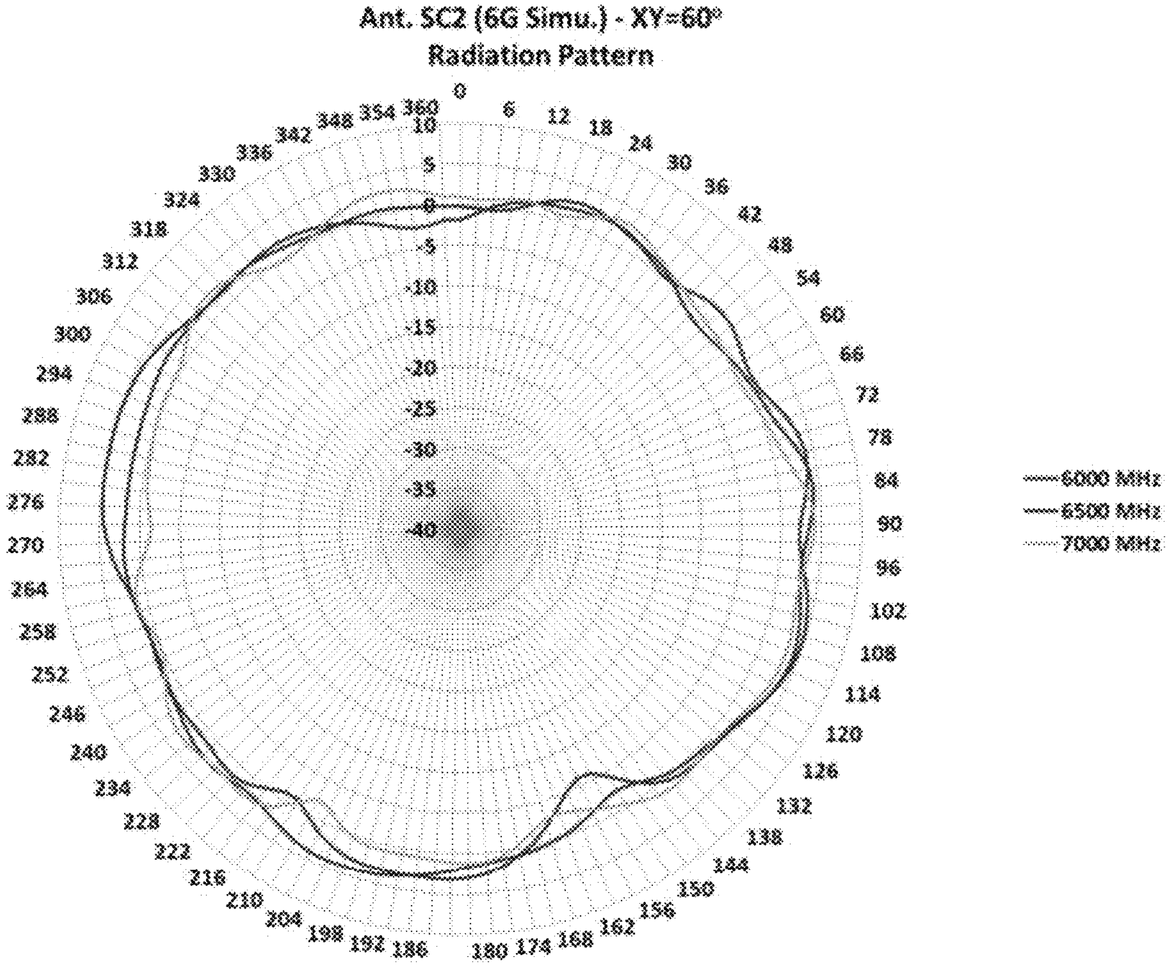
FIG. 18C is a schematic diagram of the isotropic radiation field of the second AUX antenna on XY−60° plane in the 6 G frequency band.

Referring to FIGS. 18A-18C, FIGS. 18A-18C are schematic diagrams of the isotropic radiation field of the second AUX antenna 60 on XY-60° plane in the 2.4G frequency band, the 5G frequency band and 6G frequency band respectively. As shown in the figure, the radiation field is almost circular, and the second AUX antenna 60 meets the isotropic requirement.

Figure 19:
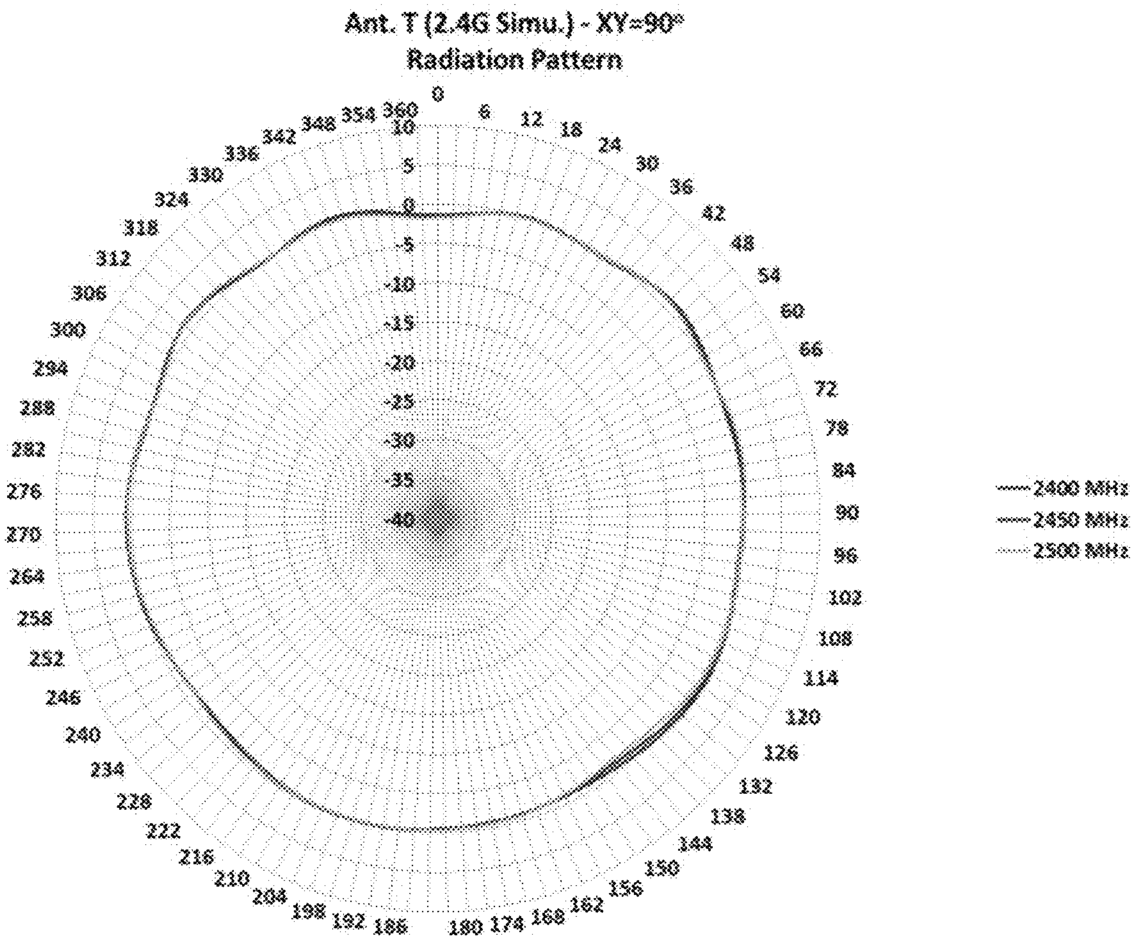
FIG. 19 is a schematic diagram of the isotropic radiation field of the IoT antenna on the XY−60° plane in the 2.4 G frequency band.

Referring to FIG. 19, FIG. 19 is a schematic diagram of the isotropic radiation field of the IoT antenna 70 on the XY-60° plane in the 2.4G frequency band. As shown in the FIG. 19, the radiation field of the IoT antenna 70 is almost circular, meeting the isotropic requirement.

Compared to prior art, the first group of MIMO antennas and second group of MIMO antennas of the antenna system provided by the embodiments of the present disclosure both include two vertically polarized antennas and two horizontally polarized antennas to avoid blind spots in reception and ensure effective reception. By configuring the first dual-band antenna and the first single band antenna of the vertically polarized antennas at diagonal corners of the base, and the third single band antenna and the fourth single band antenna of the vertically polarized antennas at another diagonal corner of the base, the isolation between the antennas can reach 30 dB or more. By configuring the first isolation component between the second dual-band antenna and the sixth single band antenna of the horizontally polarized antenna, and configuring the second isolation component between the second single band antenna and the sixth single band antenna, the isolation degree between antennas reaches over 30 dB, which meets the requirement for isolation degree between antennas and solves the problems of low isolation degree and uneven signal coverage range in high throughput antenna systems in prior art, as well as the existence of receiving blind spots.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna system, arranged on a base, comprising a first group of MIMO (Multiple Input Multiple Output) antennas and a second group of MIMO antennas, wherein:

the first group of MIMO antennas comprises:

a first dual-band antenna, provided with a high-frequency resonance structure which is perpendicular to the base and arranged at a first corner of the base;

a second dual-band antenna, wherein the second dual-band antenna is a planar structure which is parallel to the base, and the second dual-band antenna is arranged on a first side of the base and adjacent to the first dual-band antenna;

a first single band antenna, vertically arranged at a second corner of the base, wherein the first corner and the second corner are diagonal;

a second single band antenna, wherein the second single band antenna is a planar structure parallel to the base, and the second single band antenna is arranged on a second side of the base and adjacent to the first single band antenna; the first dual-band antenna and the first single band antenna are vertically polarized antennas, and the second dual-band antenna and the second single band antenna are horizontally polarized antennas;

the second group of MIMO antennas comprises:

a third single band antenna, vertically arranged in a third corner of the base;

a fourth single band antenna, vertically arranged at a fourth corner of the base and adjacent to the second single band antenna, and the third corner and the fourth corner are diagonal;

a fifth single band antenna, wherein the fifth single band antenna is a planar structure parallel to the base, and is arranged between the first dual-band antenna and the third single band antenna;

a sixth single band antenna, wherein the six single antenna is a planar structure parallel to the base, and is arranged between the first single band antenna and the third single band antenna; the third single band antenna and the fourth single band antenna are vertically polarized antennas, and the fifth band antenna and the sixth single band antenna are horizontally polarized antennas;

a first isolation component, in a long strip shape and arranged between the second dual-band antenna and the fifth single band antenna; and a second isolation component, in a long strip shape and arranged between the second single band antenna and the sixth single band antenna.

2. The antenna system according to claim 1, further comprising:

a first AUX (Auxiliary) antenna, arranged on a side of the fifth single band antenna;

a second AUX antenna, arranged on a side of the second single band antenna; and an IoT (Internet of Things) antenna, arranged between the first single band antenna and the third single band antenna.

3. The antenna system according to claim 1, wherein the first dual-band antenna comprises:

a first grounding structure, in a convex shape and arranged on the base;

a first connecting part, in a Π-shaped shape and vertically connected to the first grounding structure, and forming a first narrow gap with the first grounding structure; and a high-frequency resonance structure, comprising a first part and a second part, wherein the first part is in a trapezoid shape and vertically connected to the first connecting part; the second part is in a long strip shape, and one side of the second part is connected to the first connecting part through the second connecting part and the third connecting part; and the second part, the second connecting part, and the third connecting part all have a gap with the first part.

4. The antenna system according to claim 1, wherein the second dual-band antenna is arranged on a first substrate, and the second dual-band antenna comprises:

four first up windmill radiation patches, arranged on an upper surface of the first substrate and symmetrically distributed on a first circumference; and four first down windmill radiation patches, arranged on a lower surface of the first substrate and symmetrically distributed on a second circumference, wherein a radius of the first circumference is greater than a radius of the second circumference.

5. The antenna system according to claim 4, wherein:

each first up windmill radiation patch and each down windmill radiation patch is in an F-shaped shape; and an orientation of the four first up windmill radiation patches is different from an orientation of the four first down windmill radiation patches.

6. The antenna system according to claim 1, wherein the first single band antenna, the third single band antenna, and the fourth single band antenna have a same structure, the structure comprising:

a metal sheet, fixed on the base;

a planar inverted F antenna, printed on a second substrate, wherein the second substrate is vertically fixed on the metal sheet, and the planar inverted F antenna comprises:

a third part, in a long strip shape and arranged on a first side of the second substrate;

a fourth part, in a ¬-shaped shape, wherein one end of the fourth part is vertically connected to one end of the third part, and the other end of the fourth part is perpendicular to the second substrate;

a fifth part, in a long strip shape and arranged on a second side of the second substrate; and a sixth part, in a long strip shape and arranged on the second side of the second substrate, and projections of the fifth part and the sixth part on the first side of the second substrate are respectively distributed on two sides of the third part.

7. The antenna system according to claim 1, wherein the second single band antenna, the fifth single band antenna, and the sixth single band antenna have a same structure and are respectively arranged on a third substrate, the structure comprising:

four second up windmill radiation patches, arranged on an upper surface of the third substrate, and symmetrically distributed on a third circumference; and four second down windmill radiation patches, arranged on a lower surface of the third substrate, and symmetrically distributed on a fourth circumference; wherein a radius of the third circumference is equal to a radius of the fourth circumference, and each first up windmill radiation patch and each down windmill radiation patch are in a 7-shaped shape; and an orientation of the four second up windmill radiation patches is different from an orientation of the four second down windmill radiation patches.

8. The antenna system according to claim 1, wherein each of the first AUX antenna and the second AUX antenna comprises:

a seventh part, in a long strip shape and fixed to the base, wherein one end of one side of the seventh part is vertically connected to an eighth part and a ninth part;

a fourth connecting part, wherein one end of the fourth connecting part is vertically electrically connected to the other end of one side of the seventh part;

a tenth part, in a long strip shape and provided with a T-shaped slot, and electrically connected to the other end of the fourth connecting part; and an eleventh part, in 凸-shaped shape, wherein one end of the eleventh part is vertically connected to the eighth part and the other end of the eleventh part is suspended; and the eighth part and the ninth part are respectively arranged on two sides of the eleventh part.

9. The antenna system according to claim 2, wherein the IoT antenna comprises:

a second grounding structure, in a 凸-shaped shape and arranged on the base;

a fifth connecting part, in a Π-shaped shape and vertically connected to the second grounding structure, and forming a second narrow gap with the second grounding structure;

a sixth connecting part, in a trapezoid shape and vertically connected to a center position of the fifth connecting part; and a twelfth part, in a disc shape, wherein a center position of the twelfth part is vertically connected to the sixth connecting part.

10. An electronic device, comprising an antenna system, wherein the antenna system is installed on a base, and the antenna system comprises a first group of MIMO antennas and a second group of MIMO antennas, and the first group of MIMO antennas comprises:

a first dual-band antenna, provided with a high-frequency resonance structure which is perpendicular to the base and arranged at a first corner of the base;

a second dual-band antenna, wherein the second dual-band antenna is a planar structure which is parallel to the base, and the second dual-band antenna is arranged on a first side of the base and adjacent to the first dual-band antenna;

a first single band antenna, vertically arranged at a second corner of the base, wherein the first corner and the second corner are diagonal;

a second single band antenna, wherein the second single band antenna is a planar structure parallel to the base, and the second single band antenna is arranged on a second side of the base and adjacent to the first single band antenna; the first dual-band antenna and the first single band antenna are vertically polarized antennas, and the second dual-band antenna and the second single band antenna are horizontally polarized antennas;

the second group of MIMO antennas comprises:

a third single band antenna, vertically arranged in a third corner of the base;

a fourth single band antenna, vertically arranged at a fourth corner of the base and adjacent to the second single band antenna, and the third corner and the fourth corner are diagonal;

a fifth single band antenna, wherein the fifth single band antenna is a planar structure parallel to the base, and is arranged between the first dual-band antenna and the third single band antenna;

a sixth single band antenna, wherein the six single antenna is a planar structure parallel to the base, and is arranged between the first single band antenna and the third single band antenna; the third single band antenna and the fourth single band antenna are vertically polarized antennas, and the fifth band antenna and the sixth single band antenna are horizontally polarized antennas;

a first isolation component, in a long strip shape and arranged between the second dual-band antenna and the fifth single band antenna; and a second isolation component, in a long strip shape and arranged between the second single band antenna and the sixth single band antenna.

11. The electronic device according to claim 10, wherein the antenna system further comprises:

a first AUX antenna, arranged on a side of the fifth single band antenna;

a second AUX antenna, arranged on a side of the second single band antenna; and an IoT antenna, arranged between the first single band antenna and the third single band antenna.

12. The electronic device according to claim 10, wherein the first dual-band antenna comprises:

a first grounding structure, in a convex shape and arranged on the base;

a first connecting part, in a Π-shaped shape and vertically connected to the first grounding structure, and forming a first narrow gap with the first grounding structure; and a high-frequency resonance structure, comprising a first part and a second part, wherein the first part is in a trapezoid shape and vertically connected to the first connecting part; the second part is in a long strip shape, and one side of the second part is connected to the first connecting part through the second connecting part and the third connecting part; and the second part, the second connecting part, and the third connecting part all have a gap with the first part.

13. The electronic device according to claim 10, wherein the second dual-band antenna is arranged on a first substrate, and the second dual-band antenna comprises:

fourth first up windmill radiation patches, arranged on an upper surface of the first substrate and symmetrically distributed on a first circumference; and fourth first down windmill radiation patches, arranged on a lower surface of the first substrate and symmetrically distributed on a second circumference, wherein a radius of the first circumference is greater than a radius of the second circumference.

14. The electronic device according to claim 13, wherein:

each first up windmill radiation patch and each down windmill radiation patch is in an F-shaped shape; and an orientation of the four first up windmill radiation patches is different from an orientation of the four first down windmill radiation patches.

15. The electronic device according to claim 10, wherein the first single band antenna, the third single band antenna, and the fourth single band antenna have a same structure, the structure comprising:

a metal sheet, fixed on the base;

a planar inverted F antenna, printed on a second substrate, wherein the second substrate is vertically fixed on the metal sheet, and the planar inverted F antenna comprises:

a third part, in a long strip shape and arranged on a first side of the second substrate;

a fourth part, in a ¬-shaped shape, wherein one end of the fourth part is vertically connected to one end of the third part, and the other end of the fourth part is perpendicular to the second substrate;

a fifth part, in a long strip shape and arranged on a second side of the second substrate; and a sixth part, in a long strip shape and arranged on the second side of the second substrate, and projections of the fifth part and the sixth part on the first side of the second substrate are respectively distributed on two sides of the third part.

16. The electronic device according to claim 10, wherein the second single band antenna, the fifth single band antenna, and the sixth single band antenna have a same structure and are respectively arranged on a third substrate, the structure comprising:

four second up windmill radiation patches, arranged on an upper surface of the third substrate, and symmetrically distributed on a third circumference; and four second down windmill radiation patches, arranged on a lower surface of the third substrate, and symmetrically distributed on a fourth circumference; wherein a radius of the third circumference is equal to a radius of the fourth circumference, and each first up windmill radiation patch and each down windmill radiation patch are in a 7-shaped shape; and an orientation of the four second up windmill radiation patches is different from an orientation of the four second down windmill radiation patches.

17. The electronic device according to claim 10, wherein each of the first AUX antenna and the second AUX antenna comprises:

a seventh part, in a long strip shape and fixed to the base, wherein one end of one side of the seventh part is vertically connected to an eighth part and a ninth part;

a fourth connecting part, wherein one end of the fourth connecting part is vertically electrically connected to the other end of one side of the seventh part;

a tenth part, in a long strip shape and provided with a T-shaped slot, and electrically connected to the other end of the fourth connecting part; and an eleventh part, in a 凸-shaped shape, wherein one end of the eleventh part is vertically connected to the eighth part and the other end of the eleventh part is suspended; and the eighth part and the ninth part are respectively arranged on two sides of the eleventh part.

18. The electronic device according to claim 11, wherein the IoT antenna comprises:

a second grounding structure, in a 凸-shaped shape and arranged on the base;

a fifth connecting part, in a Π-shaped shape and vertically connected to the second grounding structure, and forming a second narrow gap with the second grounding structure;

a sixth connecting part, in a trapezoid shape and vertically connected to a center position of the fifth connecting part; and a twelfth part, in a disc shape, wherein a center position of the twelfth part is vertically connected to the sixth connecting part.

* * * * *